United States Patent [19]

Staufenberg, Jr. et al.

[11] Patent Number: 4,622,483
[45] Date of Patent: Nov. 11, 1986

[54] PIEZOELECTRIC ELECTROMECHANICAL TRANSLATION APPARATUS AND METHOD

[76] Inventors: Charles W. Staufenberg, Jr., 575 Sycamore Vista Rd., Santa Barbara, Calif. 93108; Robert J. Hubbell, 3950 Carol Ave., Santa Barbara, Calif. 93105

[21] Appl. No.: 707,966

[22] Filed: Mar. 4, 1985

Related U.S. Application Data

[63] Continuation-in-part of Ser. No. 478,253, Mar. 24, 1983, abandoned.

[51] Int. Cl.⁴ .......................................... H01L 41/08
[52] U.S. Cl. ................................... 310/328; 310/331; 310/317
[58] Field of Search ............... 310/323, 328, 330–332, 310/317

[56] References Cited

U.S. PATENT DOCUMENTS

| | | | |
|---|---|---|---|
| 3,138,749 | 6/1964 | Stibitz | 310/26 X |
| 3,217,218 | 11/1965 | Steele | 310/328 |
| 3,292,019 | 12/1966 | Hsu et al. | 310/328 |
| 3,377,489 | 4/1968 | Brisbane | 310/328 |
| 3,649,856 | 3/1972 | O'Neill | 310/328 |
| 3,684,904 | 8/1972 | Galutva et al. | 310/328 |
| 3,902,084 | 8/1975 | May, Jr. | 310/328 |
| 3,902,085 | 8/1975 | Bizzigotti | 310/328 |
| 4,455,501 | 6/1984 | Tojo et al. | 310/328 |
| 4,468,583 | 8/1984 | Mori | 310/328 |

Primary Examiner—Mark O. Budd
Attorney, Agent, or Firm—Daniel J. Meaney, Jr.

[57] ABSTRACT

An electromechanical translation apparatus adapted to produce incremental movement relative to a separate member and having a housing, a pair of clamping and translating members each of which has a driven end and an engaging end wherein each of the engaging ends is adapted to removably clamp and translate a separate member relative to the housing in response to a driving force which is selectively applied through the clamping and translating members to the engaging ends which selectively clamp the separate member at selected locations with a clamping force which varies with the magnitude of the driving force, a pair of piezoelectric driving elements operatively coupled one each to each of the clamping and translating members wherein each of the piezoelectric driving elements is capable of being selectively expanded and contracted in response to a voltage of a selected magnitude and selected frequency to produce between the housing and the clamping and translating members a variable driving force which varies between a first magnitude and a second magnitude and which enables the engaging ends of the clamping and translating members to apply a variable clamping force to the separate member which selectively clamps the members to the separate member for incremental movement therewith and enables sliding motion at conditions other than the selective clamping condition wherein the clamping force is a function of the magnitude of the driving force is shown. A method for producing relative translational movement between an electromechanical apparatus and a separate member is also shown.

36 Claims, 40 Drawing Figures

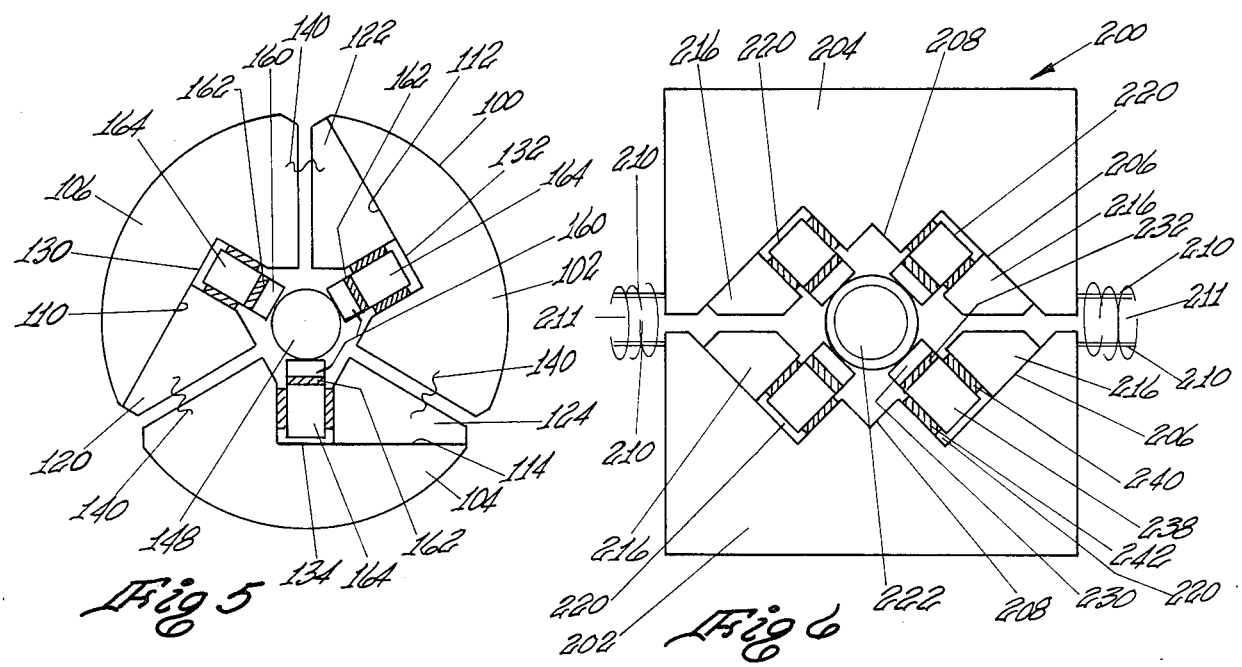
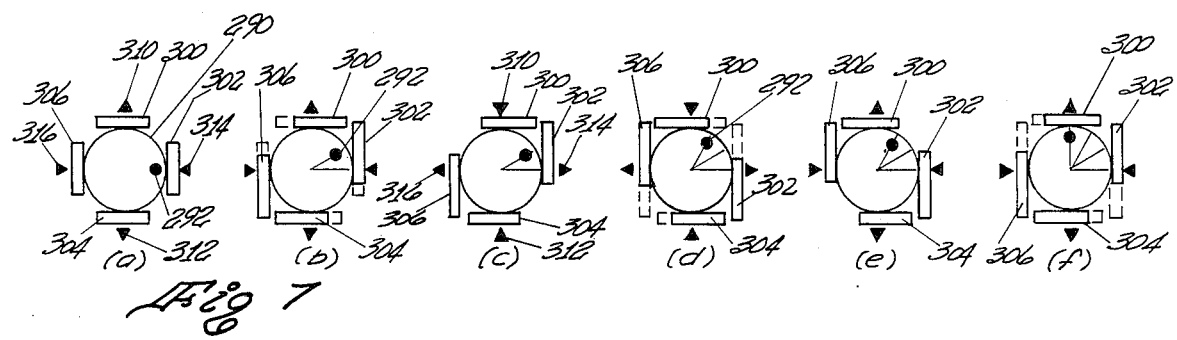
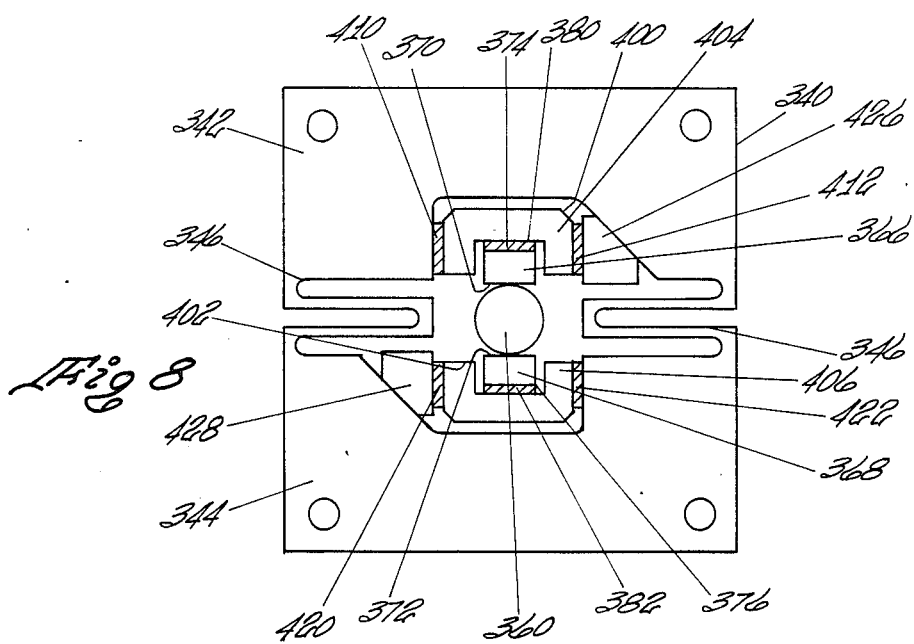

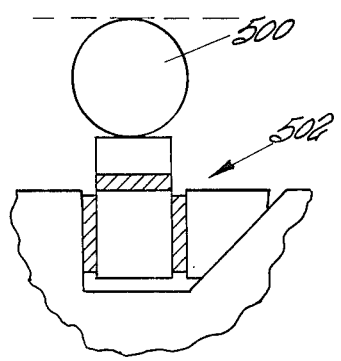
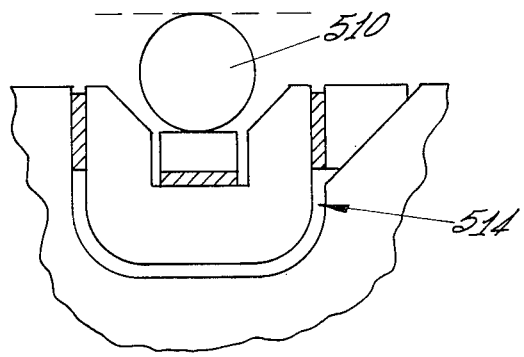
Fig 9          Fig 10
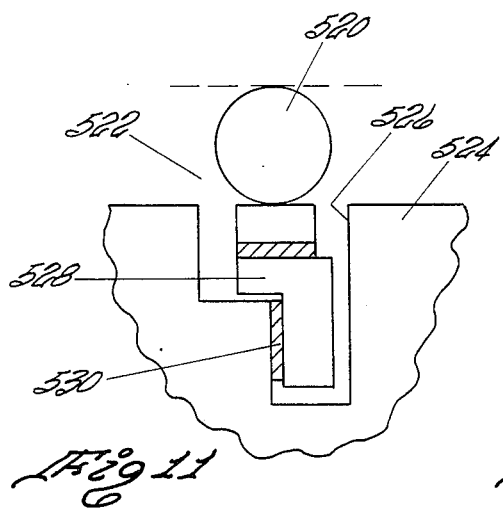
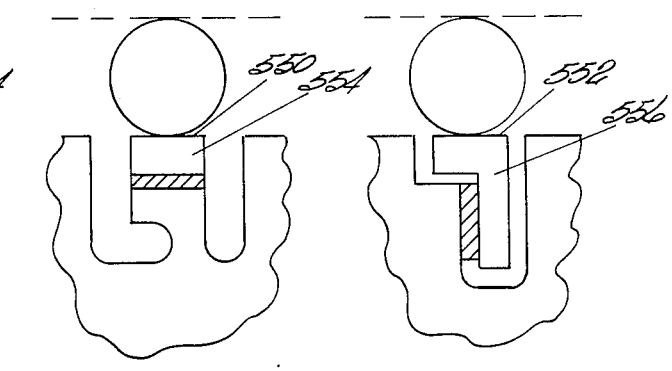
Fig 11          Fig 12          Fig 13
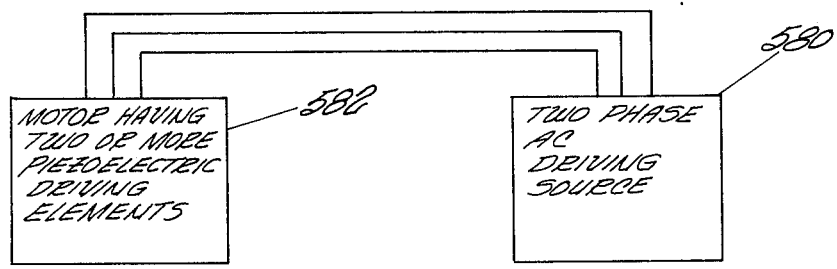
Fig 14

U.S. Patent Nov. 11, 1986 Sheet 4 of 10 4,622,483
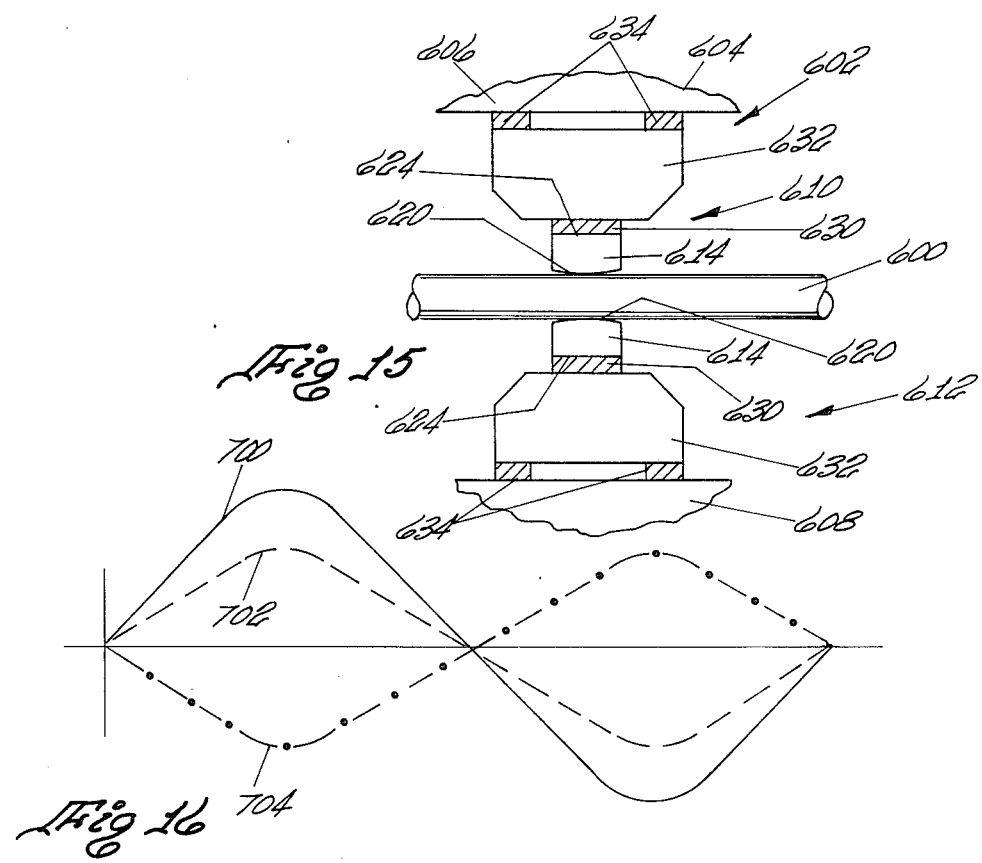
Fig 15
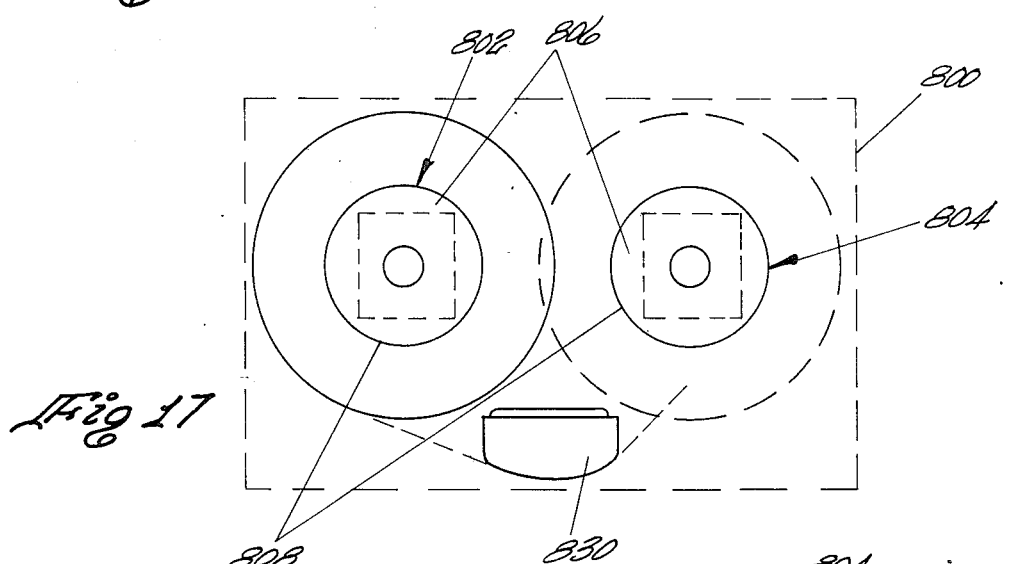
Fig 16
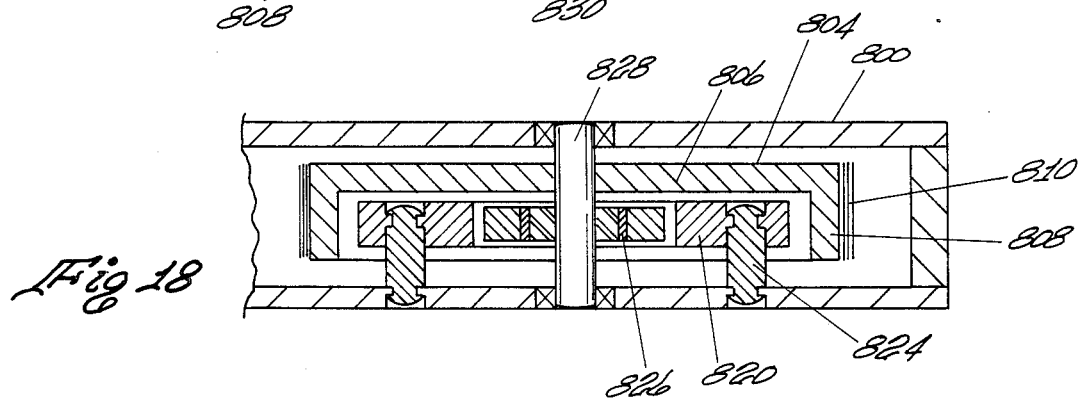
Fig 17
Fig 18

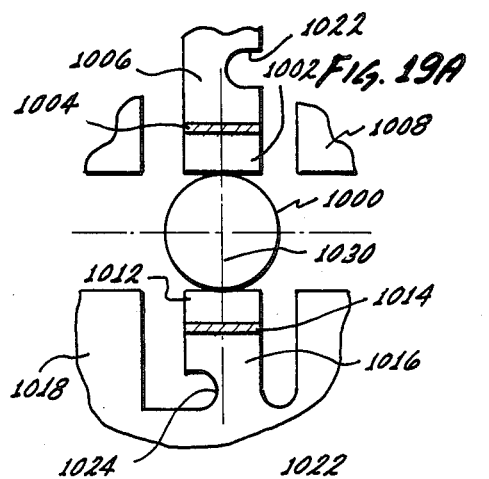
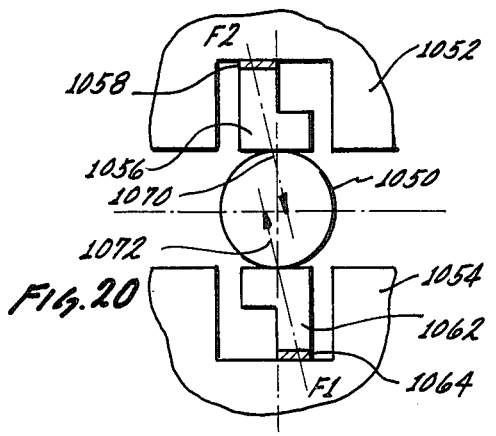
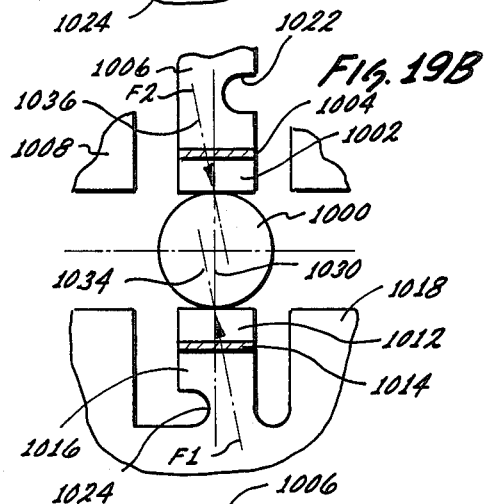
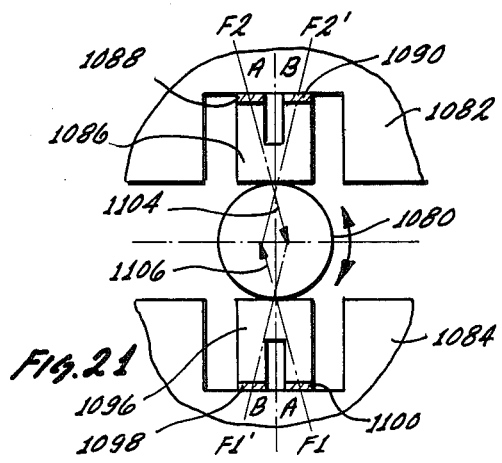
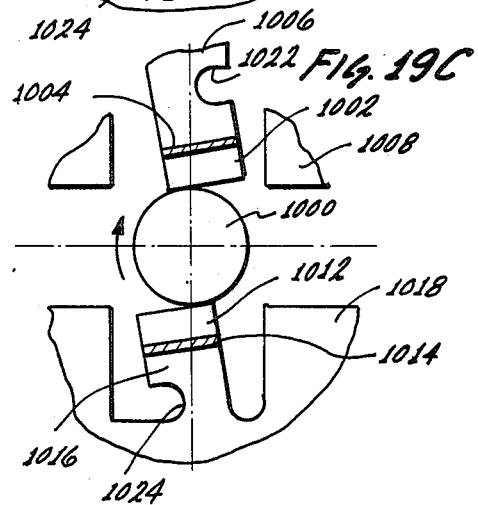
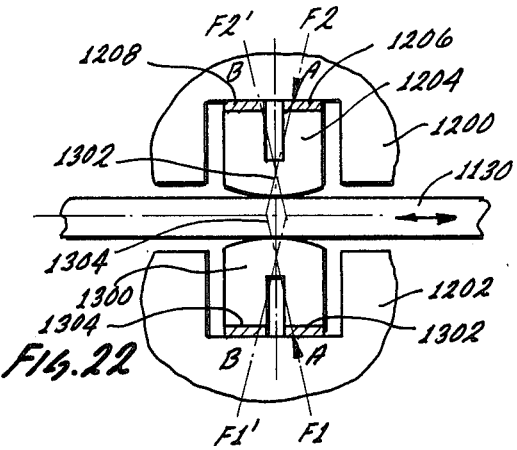
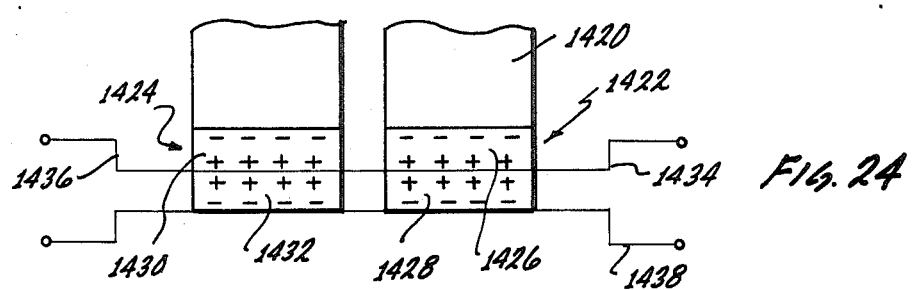

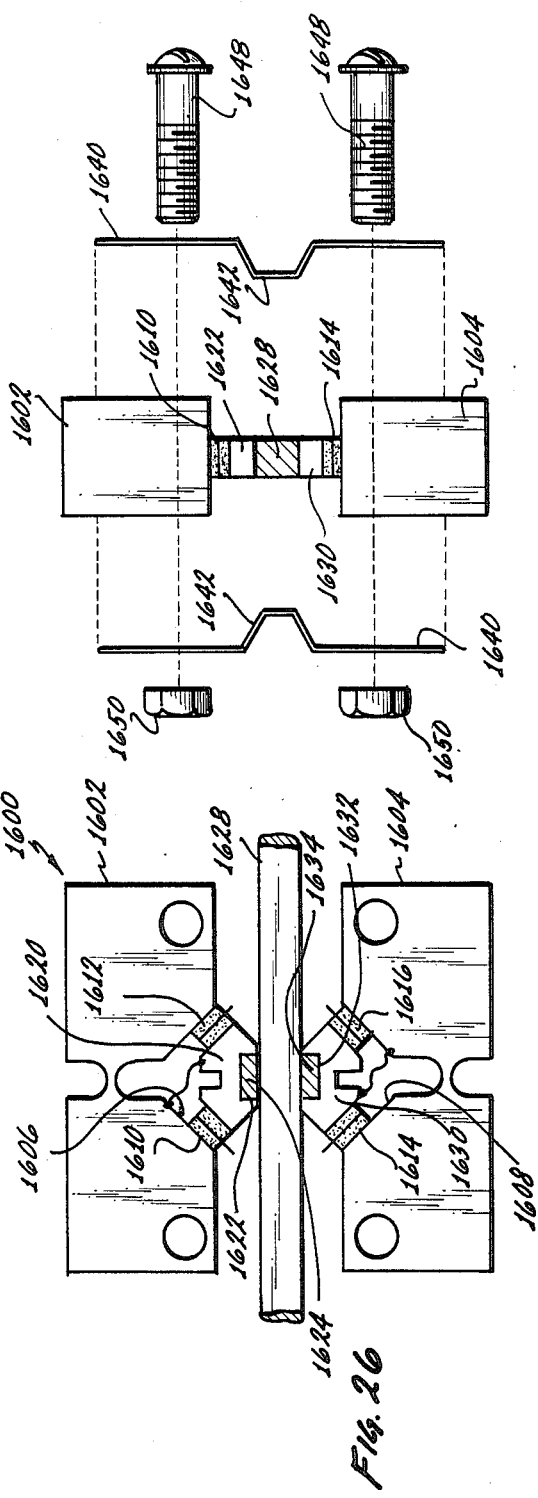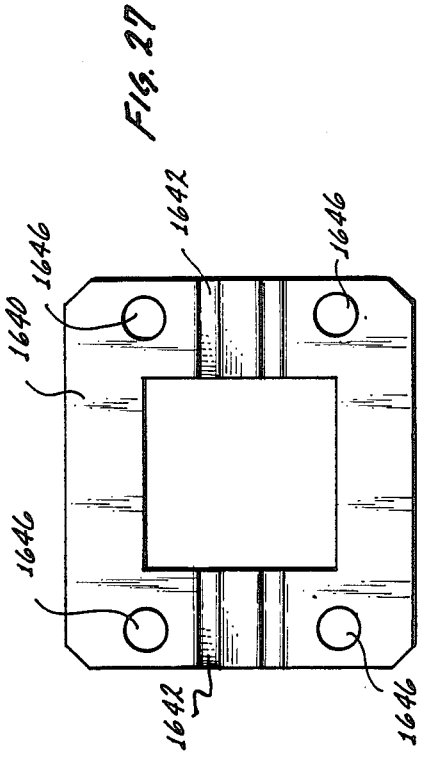

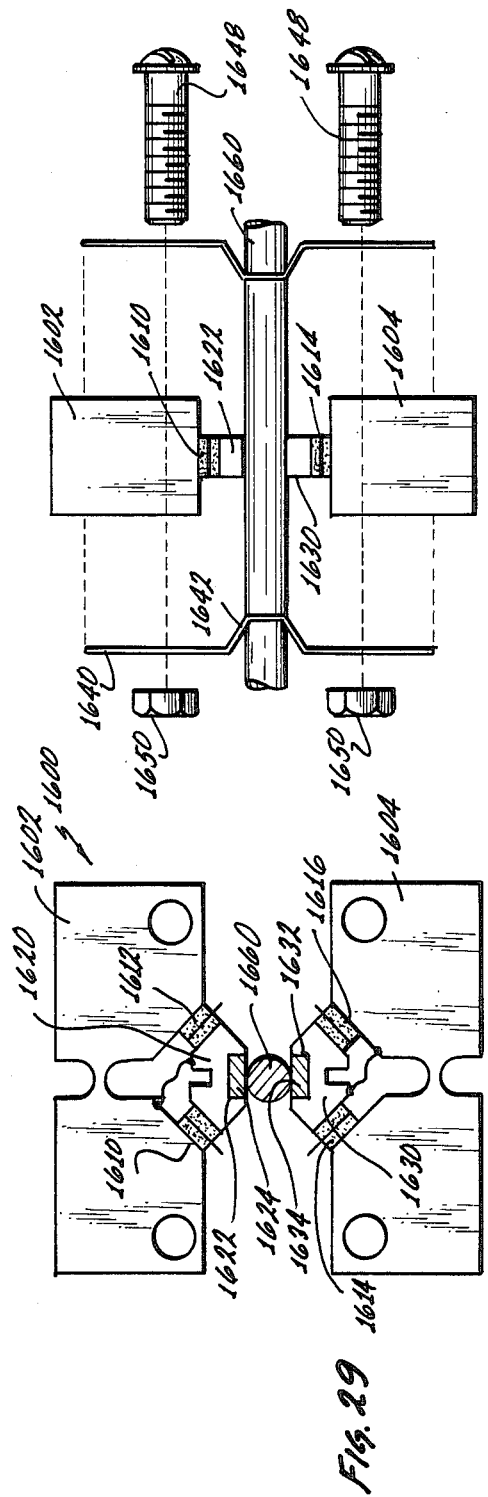

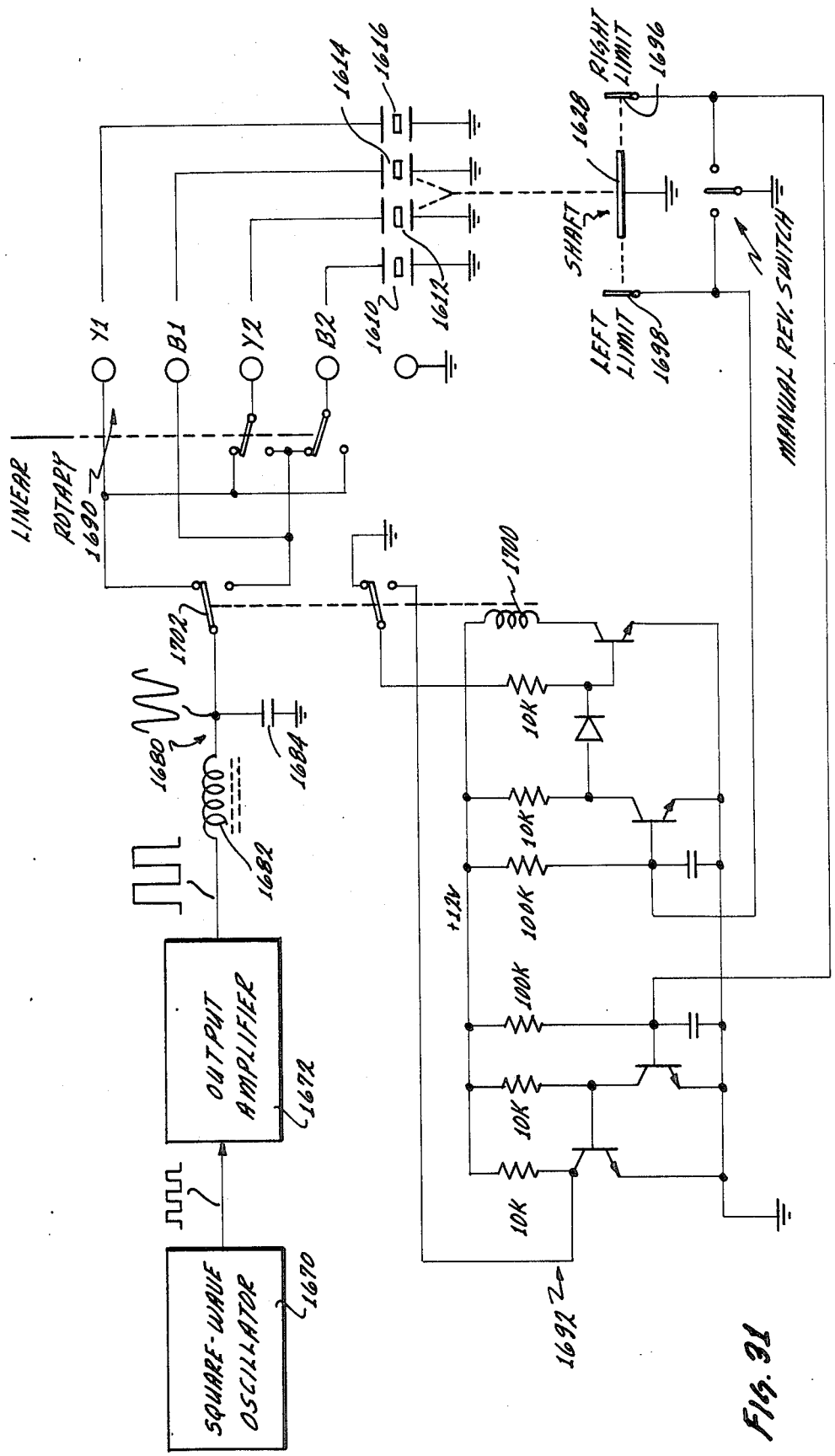

PIEZOELECTRIC ELECTROMECHANICAL TRANSLATION APPARATUS AND METHOD

BACKGROUND OF THE INVENTION

1. Field of the Invention This invention relates to an electromechanical translation apparatus and more particularly to a piezoelectric electromechanical translation apparatus wherein clamping and translating elements selectively clamp a separate member in response to a variable clamping force produced from a plurality of piezoelectric driving elements to produce either linear or rotational relative movement between the electromechanical translation apparatus and a separate member.

2. Description of the Prior Art

The concept of a piezoelectric motor or an electromechanical device to produce rotational or linear relative movement between an electromechanical device and a driven member is known in the art.

A reversible motor with a piezoelectric rotor drive having a two-tier piezoelectric driving transducer which is driven by an oscillator and a phase sifter for high speed reverse operation is disclosed in Russian Patent No. SU-651-434. In this reversible motor, the two-tier transducer is arranged in a coplanar, stacked arrangement and has a common electrode in the adjacent opposed surfaces. The outer surface of each piezoelectric element has an electrode affixed thereto. An oscillator drives one piezoelectric element in contact with a shaft in a first direction and a second piezoelectric element, which is coupled to a housing and which supports the shaft for rotation, is driven by a phase shifter in a second direction producing relative movement between the shaft and housing which rotates the shaft. In this motor, the piezoelectric element directly clamps the exterior surface of the shaft.

A unidirectional piezoelectric motor having a wedge-shaped driving element which frictionally engages the exterior surface of a shaft to rotate the same in response to vibrations of a piezoelectric element coupled between the wedge-shaped driving element and housing which rotatably supports the shaft is disclosed in Russion Patent No. SU-635-538.

The use of a piezoelectric electromechanical translation apparatus using a multi-section, axially aligned piezoelectric driver to produce linear motion between the piezoelectric electromechanical translation apparatus and a shaft is disclosed in U.S. Pat. Nos. 3,902,084 and 3,902,085. In each of these apparatus, the piezoelectric driver directly engages and clamps the shaft through electrodes formed on the surface of piezoelectric crystal in order to produce incremental, stepped movement between the apparatus and the shaft.

A piezoelectric motor for producing angular motion which is capable of being transmitted to a remotely disposed rotatable element wherein polyphase electric potentials are applied to a plurality of piezoelectric crystal elements which are so arranged and interconnected that the vibratory movements thereof are translated into the rotational movement is disclosed in U.S. Pat. No. 2,439,499.

A dynamic balancing machine for detecting the periodic forces of unbalance of a rotary body and yielding a visual or other indication of the magnitude and orientation of such forces utilizing a means for supporting each end of a rotating body to be tested upon a pair of piezoelectric quartz crystal plates as the pickup elements which are arranged in a "V" shaped support is disclosed in U.S. Pat. No. 2,461,645.

Another piezoelectric driving device having an elongated piezoelectric driving bar which is resiliently mounted to drive an intermediate rotor in response to vibrations of the piezoelectric crystal and wherein the intermediate rotor drives a main rotor is disclosed in Russian Patent No. Su-636-760.

An electrical rotary apparatus utilizing four piezoelectric elements which are supported radially from and in an equally spaced relationship on a circular shaped housing and which are adapted to be expanded, in response to a magnetic field, to engage a shaft and wherein application of an AC signal to the piezoelectric element while in contact with the shaft causes relative movement between the housing and the shaft is disclosed in Russian Patent No. SU-688-033.

SUMMARY OF THE INVENTION

This invention relates to a new, novel and unique electromechanical translation apparatus which is capable of producing either rotational or linear translation between the apparatus and a separate member, such as a rotatable shaft. In the preferred embodiment, the apparatus is in the form of an electromechanical translation apparatus which is adapted to produce incremental movement relative to a separate member. The apparatus includes a housing and first and second engaging elements each of which is positioned at a selected location within and supported by the housing. Each of the first and second engaging elements has a first end and a second end wherein the second end is located in a spaced opposed relation ship to the first end and wherein each of the first ends is adapted to selectively clamp and translate the housing relative to a separate member. The first and second engaging elements are responsive to and transmit a driving force selectively applied to the second ends therethrough to the first ends to selectively clamp and translate the separate member. A pair of piezoelectric driving elements is provided and one is operatively coupled to one of the first engaging element's second end and the other is operatively coupled to the second element's second end. The piezoelectric driving elements is capable of being selectively expanded and contracted in response to a voltage of a selected magnitude and frequency being applied thereto. The pair of piezoelectric driving elements are responsive to the voltages to produce a variable driving force which varies in magnitude between a first magnitude and a second magnitude. The driving force is produced between the housing and the first and second elements and the so-produced driving force is conducted through the first and second elements to apply a variable clamping force to the first ends of the first and second elements at a selected location of the separate member. The first and second elements are responsive to the selective expansion and contraction of the pair of piezoelectric driving elements to selectively inhibit and impart relative motion between the housing and the separate member to produce movement in a selected direction.

The present invention overcomes certain problems associated with the prior art devices. For example, certain of the known prior devices require a large number of mechanical parts such as springs, supports, intermediate rotors and the like. Also, certain of the known prior devices are capable of providing a unidirectional driving force such that a rotatable element can be driven in only one direction and the driving force cannot be easily reversed. Further, certain of the prior art devices require extremely close tolerances which are necessary in a device where the support structure is fixed relative to the moving element and where the force is applied directly between the output member and the motor frame.

In the known prior art relating to linear translation devices, the apparatus requires at least three driver sections, which are mounted in an end-to-end relationship around the shaft, requiring bridging members which are assembled in an integral relationship and in a manner to allow linear movement.

One advantage of the present invention is that a piezoelectric electromechanical translation apparatus can be utilized to produce linear or rotational motion between the apparatus and a separate member with a minimum of two piezoelectric elements.

Another advantage of the present invention is that the electromechanical translation apparatus can be utilized as a low speed, high torque motor.

A still further advantage of the present invention is that a piezoelectric motor can be fabricated with elements that have no mechanical sliding or rotating engagement therebetween and the housing thereof clings to a shaft with a controlled clamping force developed by a compliance means which is integral with the motor housing.

A still further advantage of the present invention is that dynamic driving forces are developed between driving elements having relatively small masses reacting with the relatively large mass of a floating motor frame housing.

A still further advantage of the present invention is that close dimensional tolerances for the piezoelectric driving elements, the clamping and translating members and the housing are eliminated.

A still further advantage of the present invention is that all points of contact between the driving elements and the separate member are driving points. In rotational movement apparatus, the driving elements apply rolling tangential forces to the shaft with a large torque in the driving direction. In linear movement devices, the driving elements apply a rocking motion to the engaging member in contact with a separate member with a driving force in a selected driving direction.

A still further advantage of the present invention is that a bidirectional piezoelectric translation apparatus can be fabricated which is capable of driving a shaft bidirectionally or which is capable of bidirectional linear movement relative to a separate member.

A still further advantage of the present invention is that a piezoelectric motor can be fabricated that can have unidirectional rotation based upon the driving element geometry relative to the shaft such that a greater driving force is developed in one direction of motion.

A still further advantage of the present invention is that a piezoelectric motor can be incorporated into a slow speed, high density tape recorder wherein a piezoelectric motor can be utilized to independently drive each tape hub to maintain precise control of the tape speed and tension.

A still further advantage of the present invention is that the electromechanical translation apparatus can be utilized as an incremental driving device for a wide variety of applications such as digital encoders, linear positioning devices and shaft positioning devices.

A yet further advantage of the present invention is that the electromechanical translation apparatus can be utilized as a method for imparting driving forces at ultrasonic frequencies to produce relative movement between the housing and separate member.

A yet further advantage of the present invention is that the housing for the electromechanical translation apparatus can be fabricated to include a compliance means which is capable of applying a clamping bias to a separate member to establish a controlled torque output.

BRIEF DESCRIPTION OF THE DRAWINGS

These and other advantages of the invention, together with its various features, can be more easily understood from the following and more detailed description of the preferred embodiment taken in conjunction with the following drawings wherein:

FIG. 5 is a front plan view of another embodiment of a piezoelectric motor having three driving elements;

FIG. 6 is a front plan view of another embodiment of a piezoelectric motor having four driving elements;

FIG. 7 a pictorial illustration of the method utilized by the four element piezoelectric motor of FIG. 6 to rotate a shaft;

FIG. 8 is a front plan view of a two element, piezoelectric motor wherein the housing frame includes a compliance means to insure motor-to-shaft contact;

FIGS. 9, 10, 11, 12 and 13 illustrate alternate embodiments of driving element assemblies for an electromechanical translation apparatus for producing rotational relative movement between the housing and a shaft;

FIG. 14 is a block diagram illustrating a two phase, alternating current driving source for a two or more piezoelectric element translation device;

FIG. 15 is one embodiment of a piezoelectric translation device which produces relative linear motion by a rocking motion of the piezoelectric driving means relative to the outer surface of a separate shaft;

FIG. 16 is a waveform of a voltage source showing the magnitude, frequency and programmed sequence of application of the voltages, obtained by controlling the phase thereof, to be applied to a two piezoelectric driving element apparatus to secure relative motion between the apparatus and a separate member;

FIG. 17 is a top view of a tape recorder having a piezoelectric motor for each tape hub;

FIG. 18 is a partial front sectional view showing the interior of the tape hub enclosing the piezoelectric motor within the tape recorder;

FIGS. 19A, 19B and 19C illustrate expansion of opposed piezoelectric elements and the generation of dynamic forces caused by such expansion shown by force vectors F1 and F2 to show how rotational motion is produced thereby;

FIG. 20 illustrates an alternate configuration of FIG. 12 wherein the piezoelectric elements are located at the "bottoms" of the engaging member legs;

FIG. 21 is a modification of FIG. 20 to show an alternative embodiment with the resultant vector forces F1 and F2 shown thereon;

FIG. 22 is a variation of the embodiment of FIG. 21 wherein the engaging elements are shaped to produce linear motion;

FIG. 24 a partial diagrammatic illustration of the piezoelectric elements of FIG. 23 showing the poling of the two piezoelectric elements.

FIG. 26 is a diagrammatic representation of a piezoelectric motor which is adapted to be utilized as a linear motor in cooperation with a shaft having a rectangular cross section;

FIG. 27 is a front view of a spring plate adapted to join the two housing sections of the piezoelectric motors illustrated in FIG. 26 and FIG. 29;

FIG. 28 an exploded end view of the piezoelectric motor of FIG. 26 showing the relationship between the piezoelectric driving element and shaft for imparting linear motion to the shaft;

FIG. 29 is a diagrammatic representation of the piezoelectric motor of FIG. 26 which is adapted for imparting rotational movement to a circular shaft;

FIG. 30 is an exploded end view of the motor of FIG. 29, showing the relationship between the piezoelectric driving element and the shaft for imparting rotation motion to the shaft;

FIG. 31 is a schematic diagram illustrating one embodiment of a driving circuit adapted to drive the piezoelectric motors of FIGS. 26 and 29;

DESCRIPTION OF THE PREFERRED EMBODIMENT

Figure 1:
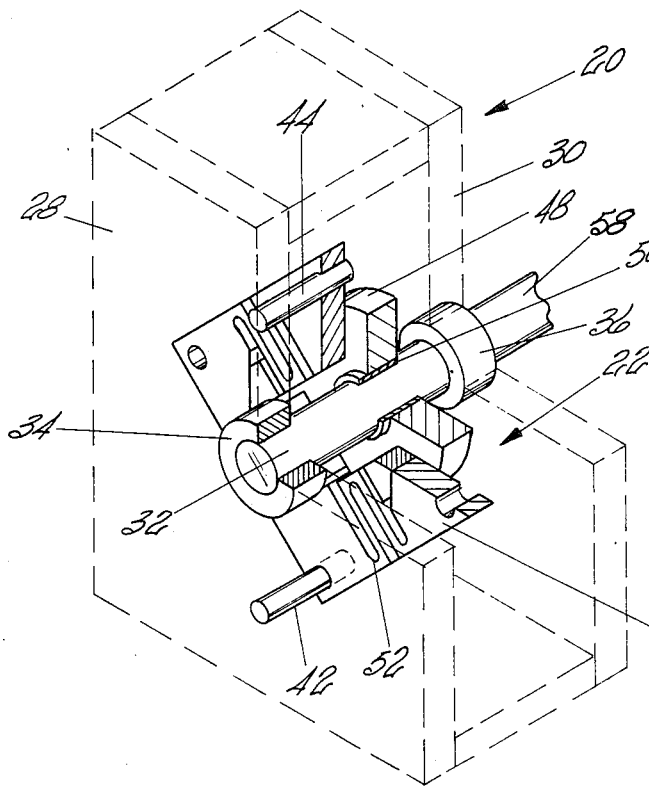
FIG. 1. is a perspective, breakaway view of an electromechanical translation apparatus adapted for use as a bidirectional motor.

In FIG. 1, a driving apparatus is shown generally by arrow 20 with the electromechanical translation apparatus shown generally by arrow 22. In the preferred embodiment, the electromechanical translation apparatus 22 utilizes piezoelectric driving elements and is fabricated as a motor. The electromechanical translation apparatus 22 or motor is mounted in and is supported by the driving apparatus 20. The driving apparatus 20 includes a front section 28 and a rear section 30. The separate member is preferably a substantially incompressible member, such as a steel shaft 32 which is rotatably mounted in bearings 34 and 36 in the front support section 28 and the rear support section 30, respectively. The shaft 32 has a relatively smooth exterior outer surface which is capable of reacting with the motor 22 producing incremental relative movement therebetween.

The electromechanical translation apparatus 22 illustrated in FIG. 1 includes a housing or motor frame 40 which is operatively coupled to the front support section 28 and the rear support section 30 by flexible supports 42 and 44, such as hard rubber supports, which extend therebetween. Thus, the motor frame or housing 40 is operatively coupled to the driving !apparatus such that the shaft 32 is rotated relative to the frame 40.

Affixed to the shaft 32 is a circular shaped driven element 48 which is mounted onto shaft 32 by means of compliant band 50 which preferably is formed of material which electrically insulates the driven element 48 from the electrical signals applied to the electromagnetic translation apparatus 22 by a voltage source. The details of the piezoelectric motor 22 are illustrated in FIG. 8.

As illustrated in FIG. 1, the housing or motor frame has a compliance or resilience means, shown generally as 52, to insure good driving element-to-shaft contact and to establish a bias clamping force keeping the clamping and translating members in continual contact with the outer surface of the shaft 32.

Figure 2:
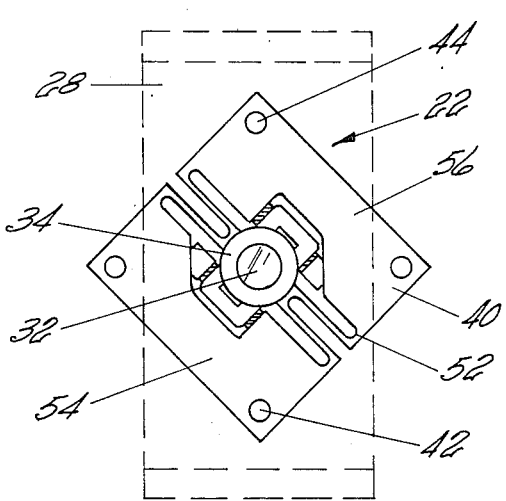
FIG. 2 is a front plan view of the electromechanical translation apparatus of FIG. 1.

The front plan view of FIG. 2 illustrates that the housing or motor frame 40 is held in position to the exterior side wall 28 by the flexible supports 42 and 44. The motor frame 40 is fabricated with two sections 54 and 56 which are joined together with a compliance means 52, which in the preferred embodiment is a symmetrical stacked spring arrangement. The compliance means 52 establishes a bias clamping force between the two sections 54 and 56 which causes the engaging members of the piezoelectric motor to clamp or grip the exterior surface of the shaft 32.

Figure 3:
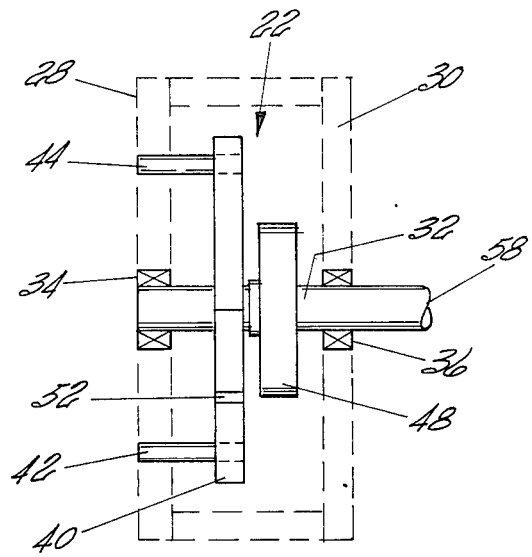
FIG. 3 is a right end plan view of the electromechanical translation apparatus of FIG. 1.

FIG. 3 illustrates that the motor frame 40 is supported by flexible supports 42 and 44 in front section 28 which permits the motor to float relative to the shaft 32. The piezoelectric motor 22 causes relative incremental movement between the shaft 32 which is journaled by bearings 34 and 36 in front section 28 and rear section 30, respectively. Rotation of the shaft 32 imparts a rotational motion, either unidirectional or bidirectional depending on the magnitude, frequency and phase of the driving voltages applied to the motor 42. In the alternative, the rotational motion of the shaft 32 can be utilized from the extended shaft section 58 which is external to the driving apparatus 20.

Figure 4:
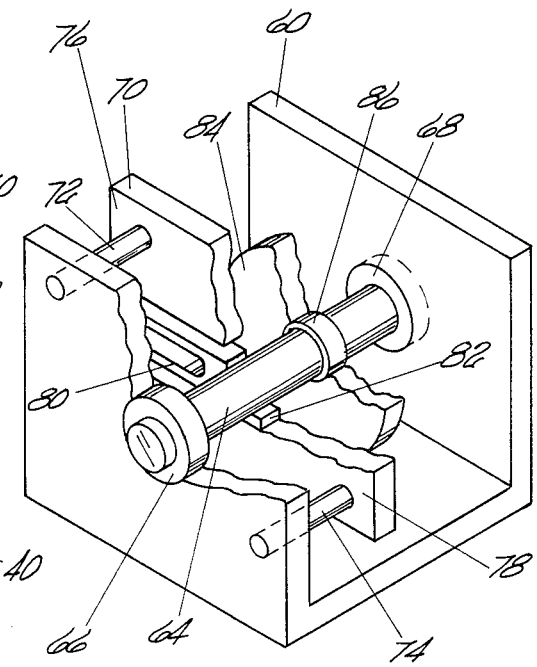
FIG. 4 is a perspective, breakaway view of a rotational driving apparatus illustrating another embodiment of an electromechanical translation motor.

The general concept of an electromechanical translation apparatus is illustrated in FIG. 4. The electromechanical translation apparatus is supported by a "U" shaped base 60 which has a housing 70 operatively coupled to the base 60 by flexible supports 72 and 74. The housing 70 has a first section 76 joined to a second section 78 through a compliance means or resilience means 80 which is adapted to urge sections 76 and 78 towards each other. The housing 70 is adapted to receive a separate member, such as shaft 64, between the sections 76 and 78. Bearings 66 and 68 in base 60 rotatably support the shaft 64. A pair of engaging elements, of which element 82 is typical, is positioned one each in each section 76 and 78 of the housing 70. Each pair of engaging elements has a contacting surface formed into a predetermined shape which is adapted to engage and clamp the shaft 64 at selected locations on the outer surface thereof with a bias clamping force having a magnitude determined by the compliance means 80. The engaging elements 82 are further responsive to a variable clamping force of a first magnitude which is additive to the bias clamping force to clamp the engaging elements 82 intimately against the outer surface of the shaft 64 so as to be incrementally shiftable therewith. The engaging elements 82 are responsive to the variable clamping force of a second magnitude which is subtractive to the bias clamping force so as to enable the engaging elements 82 to be slidably movable relative to the outer surface of the shaft 64. The engaging elements 82 are formed of a material which is capable of transmitting a driving force as a clamping force onto the selected locations of the outer surface of the shaft 64. The engaging elements 82 include a pair of piezoelectric driving elements operatively coupled thereto as explained in detail in connection with FIG. 8. The piezoelectric driving elements are capable of being selectively expanded and contracted in response to a voltage of a selected magnitude and a selected frequency being applied thereto to produce between the housing sections 76 and 78 a variable driving force which varies in magnitude between a first magnitude and a second magnitude and which is adapted to be conducted through each of the engaging members 82 to be applied to the outer surface of the shaft 64 as a variable clamping force which varies between a first magnitude and a second magnitude. The engaging elements 82 are responsive to the selective expansion and contraction of the piezoelectric elements to clamp and translate the housing 70 in a selected direction relative to the shaft 64. A driven element 84 is coupled to shaft 64 through a compliance band 86 which is preferably formed of an insulating material.

FIG. 5 illustrates an embodiment of a bidirectional electromechanical translation apparatus having three engaging elements. In the embodiment of FIG. 5, the housing 100 has three sector sections 102, 104 and 106. Each sector housing section 102, 104 and 106 has a rectangular shaped support section shown as 110, 112 and 114 respectively formed therein. Each of the rectangular shaped support sections 110, 112 and 114 has a wedge shaped member 120, 122 and 124, respectively, which includes means for defining a flat surface which forms a cavity 130, 132 and 134 in each of the sectors 102, 104 and 106, respectively. Each of the housing sections 102, 104 and 106 is joined together through a compliance means, shown generally as 140, which is adapted to urge the sections towards each other. The housing is adapted to receive a separate member, such as a shaft 148, between the sections 102, 104 and 106.

Each cavity 130, 132 and 134 has a driving assembly located therein. Each of the driving assemblies is formed of an engaging element 160 having a first end and a second end located in a spaced opposed relationship to the first end and wherein the first end has a contacting surface formed into a predetermined shape which is adapted to engage and clamp the shaft 148 at selected locations on the outer surface thereof. The engaging elements are adapted to clamp the shaft 148 with a bias clamping force having a magnitude determined by the compliance means 140. The engaging elements 160 are further responsive to a variable clamping force of a first magnitude which is additive to the bias clamping force to clamp the first end thereof intimately against the outer surface of the shaft 148 so as to be incrementally shiftable therewith. In addition the engaging elements are responsive to a variable clamping force of a second magnitude which is subtractive to the bias clamping force so as to enable the first end to be slidably movable relative to the outer surface of the shaft 148. The engaging elements are formed of a material which is capable of transmitting a driving force applied to the second end through the engaging elements and to the first end as a clamping force onto the selected locations of the outer surface of the shaft 148. Each of the engaging elements 160 has a first piezoelectric driving means 162 operatively coupled to the driven end of the engaging elements. The first piezoelectric driving means is adapted to be selectively expanded and contracted in response to a voltage of a selected magnitude and a selected frequency being applied thereto to produce between the housing 100 and the engaging element 160 a variable driving force which varies in magnitude between a first magnitude and a second magnitude and which is adapted to be conducted through the engaging element to the first end to be applied as a variable clamping force which varies between a first magnitude and a second magnitude to a selected location of the shaft 148.

The engaging elements 160 have the variable driving force applied thereto by an incremental driving means 164 having a translation state and a quiescent state. The incremental driving means 164 is operatively coupled to the housing sections 102, 104 and 106 and to the first piezoelectric driving means 162 for selectively imparting, when in a translation state, a translating force between the first piezoelectric driving means 162 and the incremental driving means 164 while the first piezoelectric driving means 162 is applying a clamping force to and causing the engaging member clamping surface to clamp the shaft 148 producing incremental relative movement between the incremental driving means 164 and the first piezoelectric means 162.

FIG. 6 illustrates another embodiment of an electromechanical translation apparatus of the present invention wherein the housing or motor support 200 has two separate sections 202 and 204 each having a substantially "W" shaped opening 206 having the center thereof formed with a notch 208 defining two driving element assembly receiving cavities in each housing section. In addition, each of the sections 202 and 204 has a pair of opposed linking pins 210 extending from the edge of the housing 200 having the driving element receiving cavities formed therein. The linking pins 210 are adapted to be located adjacent the linking pins of an identical section and are adapted to have a resilient means, such as a spring or elastic member 211 wound therearound and which has the effect of urging the two sections 202 and 204 towards each other.

Four wedge shaped members 216 are adapted to cooperate with the side walls of the "W" shaped openings to define the driving assembly receiving cavities 220. In the embodiment of FIG. 6, all of the driving element assemblies are identical in construction and are adapted to drive shaft 222 bidirectionally in response to the magnitude and frequency of the voltages applied to the piezoelectric driving elements. Depending on the application, the voltages can be applied to all of the driving elements in a programmed sequence, such as by controlling the phase relationship between the voltages applied to selected driving element assemblies. Also, the voltages could be a programmed step voltage rather than a sine wave.

In FIG. 6, each driving element assembly has a first engaging element 230 having a first end and a second end wherein the second end is located in a spaced opposed relationship to the first end. In the embodiment illustrated in FIG. 6, the first end has an outer surface formed into a substantially planar shape and which is adapted to selectively clamp the shaft 222 at a selected location on its said outer surface. The clamping force is developed from a first piezoelectric driving element 232 which is operatively coupled to the second end of the first engaging element 230. The first piezoelectric driving element 232 is capable of being selectively expanded and contracted in response to a voltage of a selected magnitude and a selected frequency being applied thereto to produce between the applicable housing section 202 or 204 and the first engaging member 230 a variable driving force which varies in magnitude between a first magnitude and a second magnitude. The first engaging member 230 transmits the variable driving force to the first end which is applied as a variable clamping force, which varies between a first magnitude and a second magnitude, to a selected location of the shaft 222. The bias clamping forces developed between the linking pins 210 and the spring 211 apply a bias clamping force between the flat planar surface of each of the first engaging elements and the surface of the shaft 222. Of course each of the first engaging elements engages the shaft 222 at a different selected location on the outer surface of the shaft.

In FIG. 6, each driving element assembly has an incremental driving means. In this embodiment, the incremental driving means includes a force member 238 which is operatively coupled to the first piezoelectric driving element 232. The force member 238 is adapted to incrementally shift the first piezoelectric driving element 232 by means of a second and third piezoelectric driving elements 240 and 242 which are operatively coupled to opposed spaced surfaces of the force member 238. The force member 238 is formed of a material which is capable of transmitting a translation force developed by and applied thereto by synchronized expansion and contraction of the second or third piezoelectric driving elements 240 and 242. The combination of the force member 238 and the second and third piezoelecric driving members 240 and 242 form the incremental driving means having a translation state when voltages are applied thereto and a quiescent state which occurs when the voltages are zero. In the translation state, either one or both of the piezoelectric driving elements 240 or 242 have a voltage of a selected magnitude and selected frequency applied thereto in order to shift the force member 238 from its center position or quiescent state to one side or the other of the cavity. The maximum displacement would be obtained by applying opposite polarity voltages of the same magnitude and frequency concurrently to the second and third piezoelectric driving elements 240 and 242 or by applying the same voltage to oppositely poled piezoelectric elements. The force member 238, which is operatively coupled to the first piezoelectric driving element 232, selectively imparts, when in a translation state, a translation force onto the force member and first piezoelectric driving element 232. If the first piezoelectric driving element 232 has a voltage of a selected magnitude and a selected frequency applied thereto which causes the first piezoelectric driving element 232 to apply a clamping force in a direction which is additive to the bias clamping force, then the first piezoelectric driving element 232 is in a clamping relationship with the surface for the shaft 222 and moves the shaft 222 incrementally therewith due to the first piezoelectric driving element 232 being translated by the force member 238. The force member 238 is moved or translated from side to side along a predetermined path to translate the piezoelectric driving elements 232 by the controlled expansion and contraction of the second and third piezoelectric driving elements 240 and 242. The expansion and contraction of the second and third piezoelectric driving elements 240 and 242 is controlled by the magnitude and programmed sequence of applying the driving voltages thereto.

The pictorial representations of FIG. 7 illustrate the method of applying the clamping forces to the surface of a shaft. FIG. 7A illustrates a shaft 290 with a dot 292 affixed to the end of the shaft 290 for reference purposes. There are four engaging elements 300, 302, 304 and 306 for driving the shaft 290. The construction of an electromechanical translational apparatus for producing the rotational motion subject of the example of FIG. 7 may be similar to that of FIG. 6.

Initially, elements 300 and 304 have a clamping force which is subtractive to the bias clamping force and the direction of the force is away from the shaft 282 as illustrated by arrowheads 310 and 312. Elements 302 and 306 have a clamping force which is additive to the bias clamping force and the direction of the force is towards the shaft 282 as illustrated by the directions of arrowheads 314 and 316. Thus, in the initial position, elements 302 and 304 are clamping the shaft In FIG. 7B, the force member or incremental driving means causes the elements 302 and 306 to incrementally shift causing the shaft 290 to incrementally rotate counter-clockwise therewith as shown by the displacement of dot 292. Concurrently, the other elements 300 and 304, which are slidable relative to the shaft 290, are shifted clockwise, by the application of appropriate voltages to the incremental driving means, into a different selected location relative to the outer surface of the shaft.

Thereupon, as illustrated in FIG. 7C, elements 300 and 304 have a clamping force applied thereto which is additive to the bias clamping force causing the elements 300 and 302 to clamp the shaft 290 as shown by the directions of arrowheads 310 and 312. Elements 302 and 306 have a clamping force applied thereto which is subtractive to the bias clamping force applied thereto as shown by arrowheads 314 and 316 enabling the shaft 290 to be slidable relative to the elements 302 and 304.

Then the elements 300 and 304 are shifted incrementally by the incremental shifting means, illustrated in FIG. 7D, in a direction to further rotate the shaft counter-clockwise as shown by the shifting of the dot 292. Concurrently, elements 302 and 306 are shifted in a clockwise direction in preparation for clamping of shaft 290 again as shown in FIG. 7E. Similarly, elements 302 and 304 are shifted incrementally causing the shaft 290 to rotate counter-clockwise as illustrated in FIG. 7F.

Referring now to the embodiment of FIG. 8, the electromechanical translation apparatus illustrated therein is similar to that illustrated in FIGS. 1, 2 and 3.

The apparatus comprises a housing 340 having a first section 342 joined to a second section 344 through a compliance means such as a formed symmetrical spring 346. The spring 346 is adapted to urge sections 342 and 344 towards each other and is adapted to receive a separate member, such as a shaft 360, between said sections. The sections 342 and 344 cooperate with the spring 346 to apply a bias clamping force onto the surface of the shaft 360.

A pair of engaging elements 366 and 368 is located one each in each section 342 and 344, respectively, of the housing 340. EAch of the pair of engaging elements 366 and 368 has a first end 370 and 372, respectively, and a second end 374 and 376, respectively, located in a spaced opposed relationship to the first ends 370 and 372. Each of the first ends 370 and 372 has a contacting surface formed into a predetermined shape, which in this embodiment is a planar surface, which is adapted to engage and clamp the shaft 360 at selected locations on the outer surface thereof. As noted herein, a bias clamping force having a selected magnitude is produced by the spring 346 and that bias clamping force urges the first ends 370 and 372 into engagement with the shaft 360. The engaging elements 366 and 368 are further responsive to a variable clamping force of a first magnitude which is additive to the bias clamping force to clamp the first ends 370 and 372 intimately against the outer surface of the shaft 360. In this arrangement, when the clamping force is additive to the bias force, both of the engaging elements clamp the surface of the shaft 360 so as to be incrementally shiftable therewith. In the alternative, where the variable clamping force is of a second magnitude which is subtractive to the bias clamping force, the first ends 370 and 372 are slidably movable relative to the outer surface of the shaft 360. The pair of engaging elements 368 and 370 is formed of a material which is capable of transmitting a driving force applied to the second ends 374 and 376 through the engaging elements 366 and 368 and to the first ends 370 and 372 as a clamping force onto selected locations of the outer surface of the shaft 360.

A pair of piezoelectric driving elements 380 and 382 is operatively coupled one each to each of the second ends 374 and 376 of the pair of engaging elements 366 and 368 and operatively coupled to their respective sections 342 and 344 of the housing 340. In this embodiment, the piezoelectric driving elements are operatively coupled to the housing sections through incremental driving means 400 and 402, each of which comprises a "U" shaped force member 404 and 406, respectively. The "U" shaped force member 404 has a pair of opposed, spaced surfaces which are adapted to cooperate with second and third piezoelectric driving elements 410 and 412 which are located in an opening in housing section 342 and held in position by a wedge 426. The "U" shaped force member 402 likewise has a pair of opposed, spaced surfaces which are adapted to cooperate with second and third piezoelectric driving elements 420 and 422 which are located in an opening in housing section 344 and held in position by wedge 428. The piezoelectric driving elements 410 and 412 operatively coupled to the "U" shaped force member 406 and the second and third piezoelectric driving elements 420 and 422 operatively coupled to "U" shaped member 426 are capable of being selectively expanded and contracted in repsonse to a voltage of a selected magnitude and a selected frequency being applied thereto to produce between the housing sections 342 and 344 and the "U" shaped force members an incremental movement which permits the engaging elements 366 and 368 to rotate shaft 360 depending on the magnitude of the clamping force applied to the engaging elements by the first piezoelectric elements 366 and 368.

In operation, the first piezoelectric driving elements 374 and 376 have a voltage of a selected magnitude and selected frequency, preferably of equal magnitude, applied thereto which is additive to the bias clamping force causing the first ends 370 and 372 to engage and clamp the outer surface of the shaft 360. In this condition, voltages of a selected magnitude and selected frequency are applied in an appropriately phased relationship, as is known in the art, to cause the second and third piezoelectric driving elements of the incremental driving means to translate or move in the same relative direction to impart a clockwise, or counter-clockwise as the case may be, rotation to the shaft 360. At the end of the translation, the first piezoelectric driving elements 426 and 428 have a voltage applied thereto which is subtractive to the bias clamping force which permits the first ends 370 and 372 to be slidable relative to the shaft 360. Concurrently, the second and third piezoelectric driving elements associated with each "U" shaped force member 404 and 406 are then subjected to voltages of a selected magnitude and selected frequency to cause the "U" shaped members to be translated back to the quiescent state causing the engaging elements to slide on the shaft and into position to repeat the cycle and to incrementally rotate the shaft again. The other incremental driving means operates in a similar manner.

In the embodiment of FIG. 9, a shaft 500 is illustrated having one driving element assembly 502 shown which is similar in construction to that of FIG. 6 and one or more similar driving element assemblies would be positioned around the periphery of the shaft in the desired configuration. The piezoelectric driving elements are formed of well known piezoelectric material and may have the electrodes formed thereon in a conventional manner. Specifically, the electrodes may be located between the piezoelectric elements and the force members such that the driving force may be passed therethrough. Alternatively, the piezoelectric element can be operatively coupled, either by a compression force or by a well-known adhesive, such as an epoxy, directly to the force member of engaging element and the electrodes may be located around the periphery of the piezoelectric element.

The embodiment illustrated in FIG. 10 includes a shaft 510 wherein only one driving element assembly 514 of a pair is shown. One or more pairs of driving element assemblies similar to that of assembly 515 may be located around the periphery of the shaft 510. The embodiment of the assembly 514 illustrated in FIG. 10 includes a different form of a "U" shaped member than that of FIG. 8. The operation of the asseembly in FIG. 10 is similar to that of FIG. 8.

The embodiment of FIG. 11 illustrates a shaft 520 having a driving element assembly 522, which is one of at least one pair of driving element assemblies, located at a selected location on one side of the outer surface of shaft 520. Two or more similar elements, supported by a housing having two or more housing sections, can be positioned at different selected locations relative to each side of the shaft 520. Each housing section, of which housing section 524 is typical, includes a stepped type opening 526 which supports in incremental driving means having an "L" shaped force member 528 which is operatively coupled to the housing section 524 through a piezoelectric driving element 530.

The embodiments illustrated in FIGS. 12 and 13 are one of two or more piezoelectric driving element devices located in a housing. The geometry or shape of the first ends 550 of FIG. 12 and 552 of FIG. 13 of the engaging elements 554 and 556, respectively, are controlled to obtain the desired direction of rotation by a rocking motion similar to that obtained by the embodiment of FIG. 15 as described hereinbelow. In this embodiment, shear stress is developed within each of two or more of the piezoelectric driving elements and the relieving of the stress results in the obtaining of the incremental translation motion between the shaft and housing.

FIG. 14 is a block diagram for use of a two phase alternating current voltage source 580 for driving a motor having two or more piezoelectric driving elements illustrated generally by 582.

In the preferred embodiment as illustrated in FIG. 8 which is adapted to be driven by a voltage source illustrated in FIG. 14, the engaging elements were formed of a C-2 carbide. The surface adapted to engage the shaft was lapped optically flat The housing, force member and wedges were formed of type 6061 T6 aluminum. The shaft was formed of steel having a hardness of Rockwell C62 or greater. The bearings were ball bearings. The electrical characteristics of the voltages were 98 kolohertz in a sine wave format and with an amplitude of approximately 100 volts peak-to-peak. The power input at no load was approximately 100 milliwatts. The electromechanical translation apparatus of FIG. 8 produced a torque of one inch-ounce.

The teachings of this invention are equally applicable to apparatus for producing linear motion. In the embodiment of FIG. 15, an elongated separate member, which is preferably an elongated shaft 600, has the electromechanical translation apparatus 602 including a housing 604 positioned therearound. Either the housing 604 of the apparatus 602 or the elongated shaft 600 can be fixed to produce the relative incremental movement therebetween. The housing 604 is illustrated to have two sections 606 and 608 which are each adapted to support a driving assembly 610 and 612 of similar construction. Each driving element assembly 610 and 612 has a first engaging means 614 positioned one each in each section of the housing 606 and 608. Each of the engaging elements 614 has a first end 620 and a second end 624 located in a spaced opposed relationship to the first end 620. In this embodiment, the first ends 620 each have a contacting surface formed into a predetermined shape which is adapted to engage and clamp the surface of shaft 600. In the embodiment of FIG. 15, the predetermined shape of the contacting surface is arcuate-shaped in order to impart a rocking motion to the first engaging element 614 relative to the shaft 600. A compliance means, similar to that illustrated in FIG. 8, may be used to urge both first engaging means against the outer surface of the shaft 600 with a bias clamping force having a magnitude determined by the compliance means. The engaging elements 614 are further responsive to a variable clamping force of a first magnitude which is additive to the bias clamping force to clamp the first end 620 intimately against the outer surface of the shaft 600.

The variable clamping force is developed from a pair of piezoelectric driving elements 630, one each being operatively coupled to the second ends 624 of each of the engaging elements 614 The piezoelectric driving elements are operatively coupled one each to the sections 606 and 608 of the housing 604. In a similar manner to the apparatus described hereinbefore, the piezoelectric driving elements 630 are capable of being selectively expanded and contracted in response to a voltage of a selected magnitude and a selected frequency being applied thereto to produce between the housing sections 606 and 608 a variable driving force which varies in magnitude between a first magnitude and a second magnitude and which is adapted to be conducted through each of the engaging members 614 to the arcuate-shaped first ends 620 to be applied to the outer surface of the shaft as a variable clamping force which varies between a first magnitude and a second magnitude.

A pair of "D" shaped force members 632, which is merely an example of a force member, includes means defining an outer surface having two opposed translation surfaces which are adapted to be operatively coupled to a second and third piezoelectric driving means 634, one of which is operatively coupled to a different one of the translation surfaces on the force member The second and third piezoelectric driving means 634 are capable of being selectively expanded and contracted in response to a voltage of a selected magnitude and selected frequency to produce an incremental linear movement in a selected direction. A control means, similar to that illustrated in FIG. 14, can be used for producing electrical signals of a selected magnitude and selected frequency and for selectively applying the same to the first, second and third piezoelectric means in a programmed sequence to produce relative linear movement between the supporting means and the member.

FIG. 16 illustrates by means of waveforms the characteristics of the voltages used in practicing this invention. As shown by the voltage refrence waveform 700, this voltage is used to develop the translation motion of the force member in the form of that illustrated in FIG. 8. The preferred shape of the voltage is a sinusoidal shape. A clamping voltage of a first magnitude is shown by voltage 702 and this voltage is in phase with the translation voltage 700. This voltage has a magnitude which is approximately equal to 50% of that of the translation voltage shown by waveform 700. The variable clamping force is developed in a direction which is additive with the bias clamping force to insure clamping and incremental movement of the shaft and engaging element together. The opposite clamping voltage is illustrated by waveform 704 and is illustrative of the voltages applied to the piezoelectric driving means for an unclamping movement or sliding movement between the engaging element and the shaft. The voltage has magnitude which is approximately equal to 50% of that of the translation voltage illustrated by waveform 700.

FIGS. 17 and 18 illustrate an embodiment of a tape recording and reproducing apparatus 800 which has two coplanar tape hubs 802 and 804 which act as supply and takeup reels for the apparatus. Each of the tape hubs has a disc-shaped central section 806 and a raised edge 808 extending around the periphery thereof. The thickness of the raised edge 808 approximates the width of the tape 810 to be used for the recording medium. Thus, the interiors of the tape hubs 802 and 804 are essentially hollowed-out central areas which have a geometrical dimension to accommodate a piezoelectric electromechanical translation apparatus 820 of the present invention mounted by flexible supports 824 to the housing 800. The electromechanical translation apparatus 820 is positioned around the hub spindle shaft 828 of each reel and the engaging element 826 is in direct driving contact therewith. The hub spindle shafts are journaled in the apparatus housing 800 using standard bearings. Voltages can be applied separately to each electromechanical translation apparatus such that the supply reel is under tension relative to the takeup reel which permits accurate tape speed and control. The tape head 830 can be of conventional design for high density recording of data onto and from a slowly moving tape.

The electromechanical translation apparatus of the present invention has wide utility as a motor. In applications where precise control of a drive member is critical, such as in a digital encoder, the rate of rotation of the shaft or driven member can be precisely controlled electronically. Further, in applications where the linear position of a first article to a second article is to be controlled, the linear movement and position of an article can be controlled by a control means which by controlling the magnitude and phasing of the voltages applied to the electromechanical translation apparatus so as to control rate of and amount of incremental movement. The apparatus of the present invention are adapted to be operated at ultrasonic frequencies. Also, apparatus can be designed using the teachings of the present invention to produce pulsed sequences of variable clamping forces and translational motions and the control means therefor may be a suitable, polyphase electrical source.

FIG. 19A is the embodiment of FIG. 12 showing additional detail. A pair of piezoelectric driving elements is adapted to impart rotational motion to a shaft 1000. Housing 1008 includes a leg member 1006 having a notch 1022. A piezoelectric driving element 1004 is positioned between an engaging element 1002 and the leg member 1006. In a similar manner, the opposite one of the pair of piezoelectric driving elements is located in a housing 1018 and includes a leg member 1016, which includes a notch 1024 therein. A piezoelectric driving element 1014 is positioned intermediate the engaging element 1012 and the leg member 1016. The engaging elements 1002 and 1012 are in intimate engagement with the shaft 1000. As illustrated in FIG. 19A, the line 1030 passing through the points of contact of the engaging means with the shaft is offset relative to the center line of the supporting areas of the leg members 1006 and 1016 located between the notch and opposing edge of each of the leg members 1006 and 1016.

FIG. 19B illustrates a force vector 1034, designated as F1, and a force vector 1036, designated as F2, which are produced by the expansion of the piezoelectric elements 1004 and 1014. In addition, a bias clamping force is applied to the piezoelectric elements, which urges the engagement elements 1002 and 1012 into engagement with the shaft 1000. The combination of the two forces results in a bending of the leg member about the respective notch sections 1022 and 1024. Thus, the force vectors that are developed by the total clamping force cause a bending motion which is illustrated by the greatly exaggerated bending of leg members 1006 and 1016 as illustrated in FIG. 19C. The bending causes a rotational movement on shaft 1000. When the piezoelectric crystals 1004 and 1014 are relaxed due to removal of the voltage thereacross, the leg members 1006 and 1016 return to their normal positions whereupon, by energization of the piezoelectric crystals 1004 and 1014, the bending occurs about notches 1022 and 1024 to impart continual rotational motion to shaft 1000 by the alternate expansion and contraction of the piezoelectric crystals 1004 and 1014.

FIG. 20 is a modification of the piezoelectric motor illustrated in FIGS. 19A, 19B and 19C. The housing 1052 of the upper member and the housing 1054 of the lower member support the pair of piezoelectric driving elements comprising the engaging members 1056 and 1062 which engage shaft 1050 and the piezoelectric driving crystal 1058, which drives engaging element 1056, and piezoelectric element 1064, which drives the engaging element 1062. Rotational motion is imparted to shaft 1050, with force vectors 1070 and 1072 acting in a manner corresponding to force vectors 1030 and 1034 of FIG. 19B.

FIG. 21 illustrates an alternate embodiment which is a modification of that of FIG. 20. Specifically, the housings 1082 and 1084 support a pair of piezoelectric driving elements which include a "U" shaped member 1086, which is located adjacent housing 1082, and a "U" shaped member 1096, which is located adjacent housing 1084. Each leg of the "U" shaped members 1086 and 1096 has piezoelectric elements located at the ends thereof. Specifically, "U" shaped element 1086 has piezoelectric crystals 1088 and 1090 interposed between the legs thereof and the housing section 1082. In a similar manner, "U" shaped member 1096 has legs which are positioned in engagement with piezoelectric elements 1098 and 1100, which are interposed between the legs of the "U" shaped member 1096 and housing member 1084. By properly energizing the piezoelectric crystals, rotation can be imparted to shaft 1080. For example, when elements 1088 and 1100 are expanded, the vector forces illustrated as F1 and F2 are increased, causing clockwise rotation. When elements 1090 and 1098 are expanded, the force vectors F1' and F2' are increased, causing a counter-clockwise rotation. Thus, by energizing the piezoelectric crystals in the proper sequence, bidirectional rotation of the shaft 1080 is possible.

FIG. 22 illustrates an alternate embodiment of the piezoelectric motor which is adapted for bidirectional linear motion on shaft 1130. Specifically, the piezoelectric motor includes a first housing 1200 and a second housing 1202. Each of the housings incorporates one of the pair of piezoelectric driving elements. Specifically, housing section 1200 cooperates with engaging member 1204, which is in intimate engagement with shaft 1130. The driving element 1204 has the end thereof, which is in engagement with the shaft, formed of a geometric surface, such as a cylindrical shape, to permit a rocking motion of the engaging element 1204 relative to the shaft 1130. The engaging element 1204 is "U" shaped, the legs thereof in engagement with piezoelectric elements 1206 and 1208. In a similar manner, housing section 1202 cooperates with "U" shaped engaging member 1300. Engaging member 1300 is "U" shaped wherein the upper portion thereof has a geometric shape, such as a cylindrical shape, to permit a rocking motion thereof relative to the shaft 1130. The legs of the "U" shaped member 1300 are placed in engagement with piezoelectric elements 1302 and 1304, as illustrated in FIG. 22. Expansion of elements 1206 and 1302 produces a motion to the left. The force vector produced by element 1302 is illustrated by $F_1$ and by element 1206 as $F_2$. In a similar manner, expansion of elements 1208 and 1304 increases the force vector F1' and F2', producing motion to the right.

Figure 23:
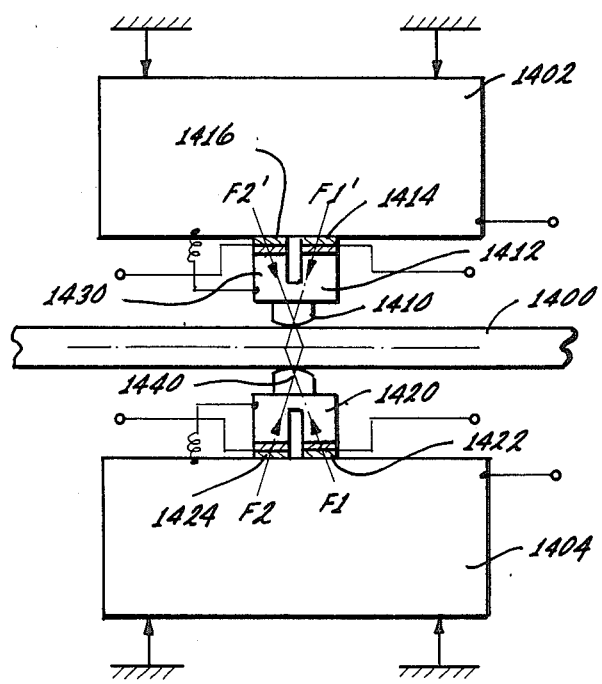
FIG. 23 an embodiment of a linear piezoelectric motor and the development of force vectors thereon to obtain linear motion.

FIG. 23 illustrates a linear piezoelectric motor utilizing a different arrangement of the "U" shaped engaging member functioning as an engaging element and the use of a plurality of piezoelectric elements to develop the rocking force. In the embodiment of FIG. 23, housing sections 1402 and 1404 each support piezoelectric driving elements. Housing 1402 communicates through piezoelectric crystals 1414 and 1416 through the legs of a "U" shaped member 1412, which terminates in a radiused surface or engaging element 1410, which engages shaft 1400. In a similar manner, housing section 1404 cooperates with piezoelectric elements 1422 and 1424 and a "U" shaped member 1420 which, in turn, has a radiused engaging section 1440 wherein the radiused section thereof engages the shaft 1400. Linear movement is developed by applying appropriate voltages to elements 1414, 1416, 1422 and 1424.

FIG. 24 shows the piezoelectric elements 1420 and 1424 used in the motor of FIG. 23. As illustrated in FIG. 23, piezoelectric element 1422 includes piezoelectric crystals 1426 and 1428, while piezoelectric element 1424 includes piezoelectric crystals 1430 and 1432. Piezoelectric crystals 1426 and 1428, as well as piezoelectric crystals 1430 and 1432, are connected electrically in what is known as a "center-tap" connection. In the "center-tap" configuration, the two piezoelectric crystals 1426 and 1428 are cemented with the same poled surfaces together against center electrode 1434. In a similar manner, piezoelectric crystals 1430 and 1432 are cemented with the same poled surfaces together against a center electrode 1436. The outer faces of each piezoelectric crystal are placed between the housing sections 1402 and 1404, and the "U" shaped members 1412 and 1420, as illustrated in FIG. 23, are also electrically connected, preferably to circuit common, or "ground" illustrated by lead 1438. In this manner, both the housing sections 1200 and 1202 and the shaft 1130 are at ground potential. When a voltage is applied to one of the center electrodes 1434 or 1436, both piezoelectric crystals of the selected pair either expand or contract, depending on the relationship of driving voltage potential to the poling of the crystals. With the center-tap connection and the common ground of the housing and "U" shaped members, all of FIG. 23, it is possible to energize two piezoelectric driving elements of FIG. 23, for example 1414 and 1422, without energizing the others to secure the desired movement.

Figure 25:
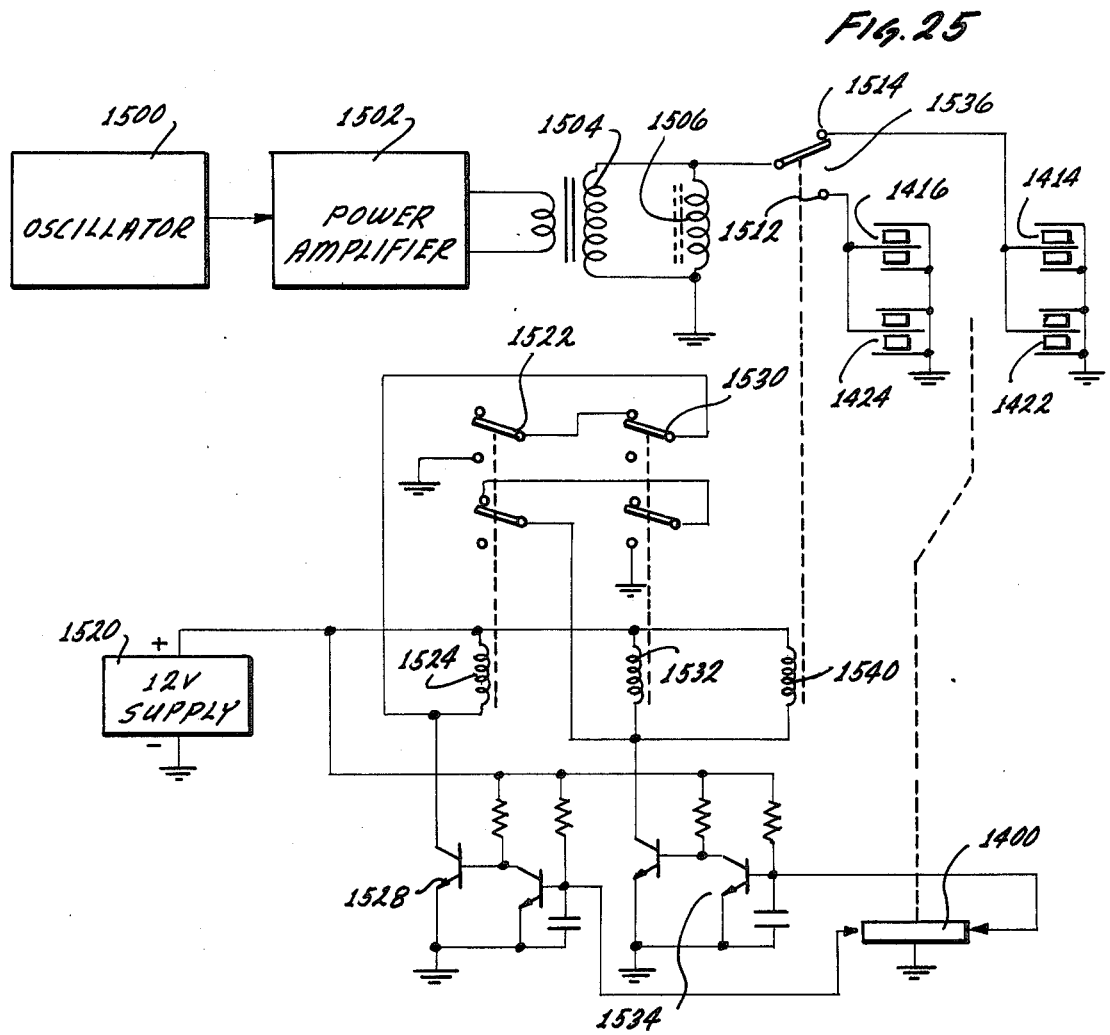
FIG. 25 a schematic diagram showing an electrical driving circuit for the embodiment of FIG. 24.

FIG. 25 illustrates an electrical circuit which is capable of driving the piezoelectric motor of FIG. 23. An oscillator 1500 applies a frequency at a selected amplitude to a power amplifier 1502 which is coupled by a step-up transformer 1504 to a resonating inductor 1506 and through relay contacts 1512 or 1514 to the selected piezoelectric driving elements of the motor. Also, a power supply 1520 applies voltages through transistorized driving circuits 1528 and 1534 to relay coils 1524 and 1532, respectively, which, in turn, drive relays 1522 and 1530, respectively, between different pole positions. The movement of the relays 1522 and 1530 energize and deenergize relay coil 1540 which, in turn, drives relay 1536. The switching of relay 1536 applies the amplified alternating current voltage from step-up transformer 1504 and resonating inductor 1506 through relay contact 1536 to the piezoelectric elements 1416 and 1424, which are electrically connected to the same relay pole 1512, or to piezoelectric elements 1414 and 1422, which are connected to the other pole 1514 of the relay 1536.

The resonating inductor 1506, in the preferred embodiment, is a 15-millihenry inductor, which is connected in parallel with the capacitance of the piezoelectric elements, having a capacitive value of approximately 900 picofarads. The electrical input is 1000 volts from peak to peak at 35 kilohertz. The velocity of movement is two inches per second, and the force developed is two ounces.

The parallel circuit formed of the resonating inductor 1506 and the capacitive piezoelectric elements 1414, 1416, 1422 and 1424 raise the load impedance across the transformer secondary of step-up transformer 1504. The switching relays 1522 and 530, which are controlled by coils 1524 and 1532, respectively, are driven by the switching circuits 1528 and 1534. The circuit includes limit switches which are located at the ends of travel of the rod or shaft 1400. The limit switch selects the appropriate set of relays to energize the piezoelectric crystal in a manner so as to drive the shaft in the appropriate direction.

FIG. 26 illustrates an electromechanical translation means 1600 which is capable of driving a driven element along either a linear path or an arcuate-shaped path. In the embodiment of FIG. 26, the apparatus 1600 includes a first housing section 1602 and a second housing section 1604. Each of the first housing section 1602 and the second housing section 1604 has a "V" shaped groove which is adapted to receive and support piezoelectric drive elements. In FIG. 26, first housing section 1602 has a "V" groove 1606 which supports piezoelectric drive elements 1610 and 1612, a first translating element 1620 and a first engaging element 1624.

The first translating element 1620 is formed to have a recessed area 1622 which is adapted to receive and support the first engaging member 1624 which, in turn, is adapted to contact the outer surface of a shaft having a rectangular-shaped cross section 1628. The first engaging member 1624 is formed of a hardened steel material in the preferred embodiment.

The second housing member 1604 has a "V" shaped section 1608 supporting piezoelectric drive members 1614 and 1616 which engage a second translating element 1630. The second translating element 1630 has a recessed area 1632 which supports a second engaging element 1634 which is likewise preferably formed of a hardened steel material.

In FIG. 26, the electromechanical translation apparatus 1600 is in the form of a linear translation device wherein linear motion occurs between the electromechanical translation device 1600 relative to a square-shaped elongated shaft member 1628.

FIG. 27 illustrates a steel spring member 1640 which has a notched area 1642 and functions as a support for each of the first housing section 1602 and the second housing section 1604. A plurality of fastening members 1648 is utilized to maintain the spring support 1640 integral with the housing sections 1602 and 1604. The shaft 1628 is positioned to move in substantially parallel relationship to the spring members 1640, as illustrated in FIG. 26.

FIG. 28 illustrates in an exploded assembly view the relationship between the first housing section 1602, the second housing section 1604, and the spring housing members 1640. Fasteners, illustrated as 1648 in FIG. 27, pass through apertures formed in the spring member 1640 and cooperate with nuts 1650 to form a mechanically rigid assembly.

As illustrated in FIG. 28, the shaft 1628 has a rectangular-shaped cross section and cooperates with the first translating element 1622 which is responsive to the piezoelectric drive members 1610 and 1612 (shown in FIG. 26) and the second translating element 1630 which is activated by piezoelectric drive members 1614 and 1616 (illustrated in FIG. 26).

FIGS. 29 and 30 show exactly the same apparatus as illustrated in FIGS. 26, 27 and 28 except, however, that the shaft 1660 is circular in cross section and is responsive to the clamping and translation action of the first translating means which includes piezoelectric drive members 1610 and 1612, the first translating element 1622, and the first engaging element 1624, and the second translation means which includes the piezoelectric drive members 1614 and 1616, the second translating element 1630, and the second engaging member 1634, to produce a rotational driving force on the shaft 1660. A spring plate in the form of that illustrated in FIG. 27 is also utilized in the testing apparatus of FIGS. 29 and 30 in the same manner as described hereinabove.

FIG. 30 illustrates that the shaft 1660 remains in the same position relative to the housing member 1602 and 1604, but it is rotated in either a clockwise or counterclockwise direction by the clamping and translation action of the first and second translation means as described herein.

As is readily apparent from FIGS. 26 through 30, an electromechanical translation device can be fabricated which is capable of producing either a linear motion or a rotational motion from exactly the same electromechanical drive assembly.

FIG. 31 illustrates one embodiment of a electrical circuit which is adapted to drive the electromechanical translation device illustrated particularly in FIGS. 26 and 29. In FIG. 26, the shaft 1620 can be designed to have the ends thereof engage limiting contacts which function to reverse the direction of the movement of the shaft. The ends of the shaft cooperate with switching members which are illustrated in the embodiment of the electrical circuit of FIG. 31. FIG. 31 includes a square wave oscillator 1670 which generates a square wave having a predetermined frequency, in the order of 75 kilohertz, and a 5-volt peak-to-peak voltage amplitude. The oscillator 1670 applies the square wave to an output amplifier 1672. Output amplifier 1672 amplifies the square wave signal to approximately 30 volts peak to peak and applies the same to an LC filter network shown generally as 1680, which network includes an inductor 1682 and a capacitor 1684. The LC network shapes the output amplifier's square wave signals to produce a sine wave output which, in turn, is applied through a set of switchable relay contacts shown generally as 1702, and through the contacts of a function selection switch, shown generally as 1690, to a selected combination of piezoelectric drive elements 1610, 1612, 1614 and 1616. The selection switch contacts 1690 are adapted to be switched between a linear mode and a rotary mode, which permits the circuit to operate the motor embodiment illustrated either in FIG. 26 or in FIG. 29.

A reversing relay drive circuit, shown generally as 1692, is responsive to the position of the shaft 1628, that is whether shaft 1628 has reached a right limit contact 1696 or a left limit contact 1698. When the shaft 1628 contacts either the right limit contact 1692 or the left limit contact 1698, the reversing relay drive circuit 1692 is responsive to the position of the shaft actuating relay coil 1700 to switch the position of the relay contact 1702 and energize a selected pair of piezoelectric driving elements that apply the required clamping and translation forces to the shaft 1628 to move the same in the opposite direction.

The selection switch 1690 positioned as illustrated in FIG. 31 is for the linear mode of operation wherein leads Y1 and Y2 are energized to drive piezoelectric crystals 1616 and 1612, respectively, to produce linear motion in one direction. When the selection switch 1690 is moved into the other position, leads Y1 and Y2 are energized to drive piezoelectric crystals 1610 and 1616, respectively, to produce rotational motion in one direction.

Figure 32:
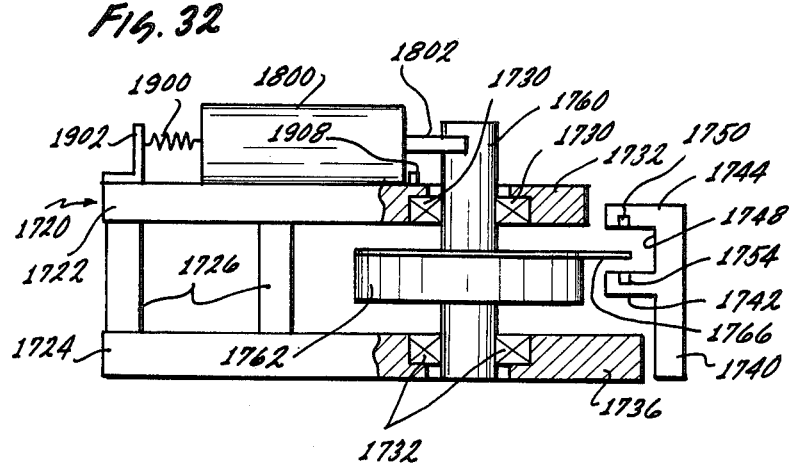
FIG. 32 is a pictorial representation of a testing apparatus used to evaluate the performance of a single piezoelectric driving assembly in imparting rotary motion to a shaft.
Figure 33:
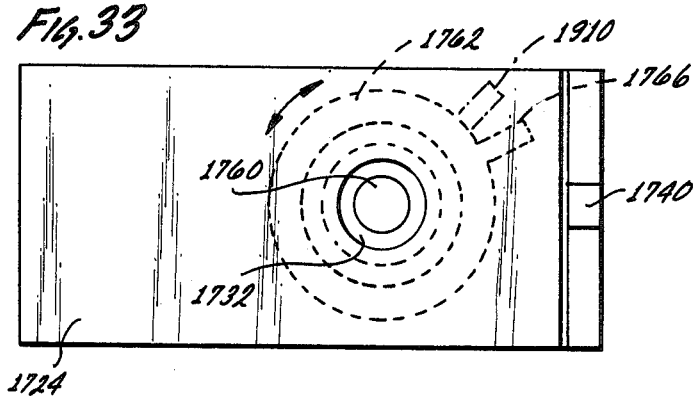
FIG. 33 is a front plan view of the testing apparatus of FIG. 32.

FIGS. 32 and 33 illustrate an electromechanical translation apparatus in the form of a testing apparatus which is capable of being driven by a single piezoelectric driving element. In FIG. 32, a housing support 1720 includes a top plate 1722, a bottom plate 1724, and intermediate support members 1726. Bearings 1730 and 1732 are mounted in bored holes in plates 1722 and 1724, respectively. An end member 1740 is operatively coupled to the upper plate 1732 or to the lower plate 1736, for example by a fastening means, and has a central extending member 1742 which cooperates with a top end member 1744 to form a "U"-shaped recessed area 1748. The "U"-shaped recessed area 1748 is essentially a gap having a light-emitting diode 1750 located on one side thereof and a photoresponsive means 1754 located in a spaced, opposed relationship on the other side thereof which is supported by the central support member 1742.

A shaft 1760 having a wheel 1762 is journaled in the bearing members 1730 and 1732 so as to be rotatably supported thereby. The outer periphery of the wheel 1762 supports a shutter member 1766 which, when the wheel 1762 is rotated, intermittently intercepts the light emanating from the light-emitting diode 1750 which is received by the photodiode 1754 to produce electrical output pulses as a function of the rate of rotation of the shaft 1760 and its wheel 1762.

Figure 34:
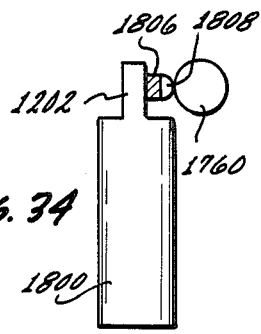
FIG. 34 a pictorial representation of one embodiment of a driving element adapted to be utilized in the testing apparatus of FIG. 32.
Figure 35:
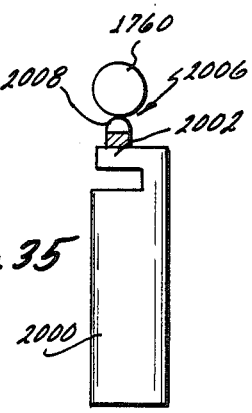
FIG. 35 is another embodiment of a driving element adapted to be utilized with the testing apparatus of FIG. 32.
Figure 36:
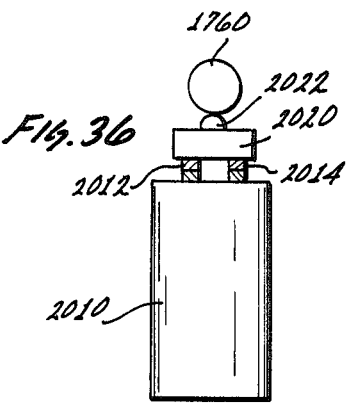
FIG. 36 is another embodiment of a piezoelectric driving element, having two piezoelectric elements, which is adapted to be used in the testing apparatus illustrated in FIG. 32.

The apparatus of FIG. 32 is adapted to be utilized with a plurality of different single piezoelectric drive elements which are illustrated in FIGS. 34, 35 and 36. The embodiment illustrated in FIG. 32 includes the drive element illustrated in FIG 34. The drive element includes a housing member 1800 which includes a centrally extended support member 1802, which positions a single electromechanical translation element having a piezoelectric crystal 1806 and a first engaging member 1808. The piezoelectric drive element 1806 in cooperation with the first engaging element 1808 are urged into driving engagement with the shaft 1760 when the piezoelectric driving element 1806 is driven at a preselected frequency and voltage level and has sufficient net clamping and translation force so as to cause the shaft 1760 to be rotated within the electromechanical translation assembly of FIG. 32. The housing member 1800 is spring loaded by means of a spring member 1900 which is positioned between and "L" shaped clamp 1902 and the housing member 1800 so as to hold the engaging member 1808 against the shaft. A pin 1908 is utilized to maintain alignment between the centrally extended support member 1802 which insures that the engaging element 1808 is maintained in engagement with the shaft 1760.

FIG. 33 is a front plan view of the test apparatus shown in the electromechanical translation apparatus of FIG. 32. As illustrated by FIG. 33, the wheel 1762 can be driven in either a clockwise or counter-clockwise rotation, depending on the frequency and polarity of the voltage applied to the piezoelectric drive element 1806 illustrated in FIG. 34. The shutter member 1766 is positioned on the periphery of the wheel 1762 so that it intercepts the light beam as illustrated in FIG. 34. If desired, the rotating wheel 1762 can have additional shutter members, for example shutter member 1910, mounted thereon to generate a plurality of pulses in response to the rotation of the wheel 1762.

As mentioned in connection with the discussion of FIG. 34 in the preferred embodiment of the electromechanical translation apparatus, the translation means comprises a single piezoelectric drive element 1806 and an engagement member 1808 which is formed of a relatively hard steel material.

FIG. 35 shows an alternate embodiment of a driving member having a housing 2000 which is formed with an "L" shaped end member 2002 which has a piezoelectric drive element 2006 and an engaging element 2008 formed thereon to drive a shaft 1760.

FIG. 36 illustrates another embodiment of a driving means having a housing member 2010, a pair of piezoelectric drive member stacks 2012 and 2014 which are operatively connected between the end of the housing member 2010 and a first engagement member 2020 which, through a protruding tab 2022 formed of a hardened steel, is in engagement with the shaft 1760.

Any one of the three embodiments illustrated in FIGS. 34, 35 and 36 can be utilized in the electromechanical translation aparatus of FIG. 32 to drive the shaft. Other embodiments and arrangements of piezoelectric crystals, engagement members, and other translation members, in the manner earlier described, are possible to provide a wide range of single-crystal piezoelectric driving elements for driving the electromechanical translation device.

Figure 37:
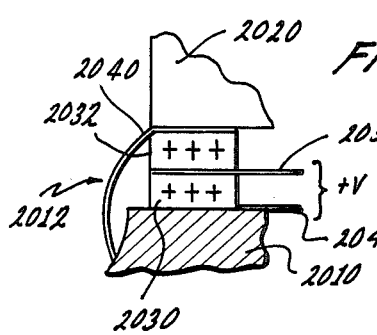
FIG. 37 is an exploded pictorial representation showing the connections to the piezoelectric driving elements of FIGS. 35, 36 and 37.

FIG. 37 illustrates the connection and polarity of one of the piezoelectric drive elements of FIG. 36, with element 2012 being illustrated in FIG. 37. Piezoelectric driving element 2012 comprises two separate piezoelectric crystals 2030 and 2032 which are stacked relative to each other with the centers thereof joined to a lead 2036. The piezoelectric crystal 2032 is in engagement with the engaging element 2020 so as to clamp and translate the end thereof as illustrated in FIG. 37. A lead 2040 connects the first engaging member 2020 to the housing support member 2010 to form a complete electrical circuit having a conductor 2042 electrically connected thereto. Thus, when a voltage of an appropriate frequency and magnitude is applied between leads 2036 and 2042, the piezoelectric crystal is expanded and contracted to produce the clamping and translation action as required to rotate the shaft 1760 illustrated in the test assembly of FIG. 32.

Figure 38:
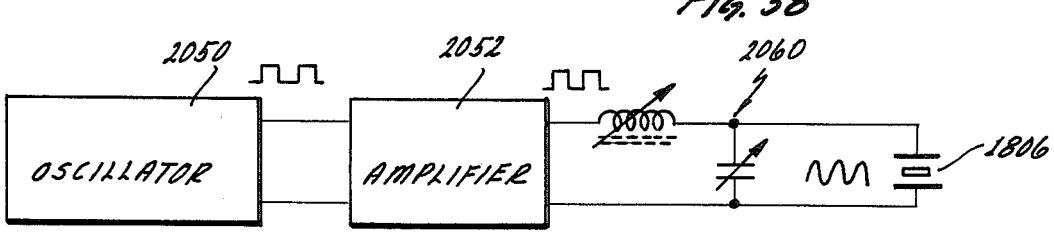
FIG. 38 is a simplified block diagram of a driving circuit which is adapted to drive the test assembly of FIG. 32.

FIG. 38 illustrates a general schematic diagram of the drive circuit which is capable of driving the electromechanical translation assembly of FIG. 32. The circuit includes an oscillator 2050 which produces a square wave output which is applied to an amplifier 2052, which amplifies the voltage at the frequency received from the oscillator. The amplified output signals, in square wave form from amplifier 2052, are applied to an LC network shown generally as 2060. The LC network develops a sine wave output signal which is used to drive the piezoelectric crystal, for example crystal 1806.

Tests were conducted using the test apparatus illustrated in FIG. 32 in combination with the various drive elements illustrated in FIGS. 34, 35 and 36. The chart set forth herein-below shows operative examples of the element, frequency (in kilohertz), peak-to-peak driving voltage, direction of rotation, and revolutions per minute obtained by use of the element during the tests.

|  | Element | Frequency (KHz) | Peak-Peak Driving Voltage | Direction of Rotation | RPM |
| --- | --- | --- | --- | --- | --- |
| FIG. 34 | 1806 | 28.8 | 200 | CCW | 300 |
| FIG. 34 | 1806 | 76.8 | 350 | CW | 300 |
| FIG. 35 | 2006 | 26.7 | 500 | CCW | 300 |
| FIG. 35 | 2006 | 72 | 300 | CW | 300 |
| FIG. 36 | 2012, 2014 | 35.8 | 350 | CW or CCW | 150 |

As is evident from the above descriptions, there are many possible designs for piezoelectric driving elements which can be utilized in the electromechanical translation device to satisfy the functional requirements of the method and apparatus of the present invention. One of the basic requirements for the method comprises vibrating the piezoelectric drive elements so that the engaging elements have a component of motion which transverses either a linear path or an arcuate-shaped path and which component has an orientation thereto so as to impart the desired motion to the driven member. For example, if a specific drive point on the driven member is to be moved to the right or to the left, the driving element must produce at least some right-to-left motion component at the engaging element's surface.

Another important step is to develop a clamping force between the driving element which is urged through an engaging member against the output member wherein the clamping force increases as the driving element moves toward one of its limits of motion and which decreases as the driving element moves toward the other end of its motion. As the "work," in terms of force x distance, is produced on the driven member, the "work" will be greater in one direction than the work produced in the other direction resulting in the driven member sustaining a net motion in the direction having the greater "work" component.

The third step is the maintaining of the driving element through its engaging element in contact with the driven member while coupling the dynamic clamping and translating forces between the output member and the reference frame of the apparatus so as to provide for a translation of motion therebetween.

Based on the above three basic requirements, or steps, there are a number of means for implementing each of the steps or elements for carrying out the teachings of this invention. Such implementation can be categorized in the following ways:

(1) Producing Desired Motion Components

In this category, there are two main types of driving element designs to produce the desired motion components:
 (a) arrangement in which the motion component is directly due to direct dynamic changes in some geometrical dimensions of the piezoelectric element; and (b) arrangement in which the dimension of the piezoelectric element is changed in amplitude and/or direction in association with an intermediate member.

The driving elements of FIGS. 9, 10 and 11 are examples of the first category, while the driving elements of FIGS. 12, 13 20, 21 and 22 are examples of the latter catetory.

Generally the direct dimensional change of piezoelectric elements is quite small, and it is usually desirable to increase the amplitude of the motion component available from the piezoelectric element to induce motion to the driven member. Preferably, the increase in amplitude of the motion component is obtained by utilizing an intermediate member which is designed to have a suitable mechanical resonant mode so that the amplitude of its periodic motion can build up over a number of cycles of the driving force of the piezoelectric element. In the alternative, an intermediate member may be designed to have a geometry which produces an amplified motion component at the driven member as compared with the direct piezoelectric displacement. The driving element of FIG. 12 is an example in which both the resonant operation and the geometrical amplification are provided. The driving element of FIG. 22 is an example which is primarily designed for geometrical amplification by means of a small angle between the contact lines and the center of the action of the piezoelectric elements. In addition, the driving elements exhibit mechanical resonances which can be used to increase motion in the desired direction.

(2) Controlling Clamping Forces

In this alternative, the two main methods for producing a controlled or phased dynamic 1 clamping forces include:

(a) arrangements which include a set of piezoelectric elements which directly act to increase and decrease the clamping forces; or
(b) arrangements in which the motion-inducing elements provide a component of motion in the clamping direction as well as in the direction of motion of the output element.

The driving elements of FIGS. 9, 10, 11 and 15 are examples of the first category, while the driving elements of FIGS. 1, 13, 20, 21 and 22 are examples of the latter category.

(3) Maintaining Engagement Element Contact

Maintaining proper contact force between engaging elements and the driving member is dependent upon several factors. First, the geometry of the driving element is such that each engaging element will be forced into contact with the driven member by the compliance means acting between the various housing sections. Essentially, a spring loading means is used for loading the housing against the driving member. The examples of FIGS. 5, 6 and 8 show arrangements for two, three or four engaging element assemblies. In FIGS. 5, 6 and 8, contact is maintained despite irregularity of the driven member's shape. The principles shown can be utilized with any desired number of engaging elements for either rotary or linear drive applications.

A second factor is to maintain the engagement element in contact with the driven member so as to position the engaging elements such that the dynamic clamping forces of one element are balanced by opposing dynamic clamping forces of other elements. This reduces or eliminates any residual forces being applied to the driven member which would have a tendency to oppose or restrict the driving force of the driving member in a desired direction. The symmetrical arrangements shown in FIGS. 5, 6 , 8, 15, 21 and 22 avoid these problems.

A third factor is to consider the inertias between the driving elements and the housing so that the dynamic forces generated by the clamping and translation means can be higher than the bias forces provided by the clamping means. In the example shown herein, the relationship between the inertias of the driving elements and the housing forces are maintained because of the large masses utilized herein for the housing sections and the fact that the housing sections are physically positioned further from the contact lines at the driven member than the driving elements. This results in the driving elements having higher polar moments of inertia.

As is readily apparent from the numerous embodiments described herein, the electromechanical translation elements can be fabricated from one or more piezoelectric driving elements, and a single piezoelectric driving element device can be fabricated to produce either linear or rotational motion between an electromechanical translation device housing and a driven member.

In certain other applications, the frequency of the signal is critical from the standpoint of the functioning of the piezoelectric drive elements. This is particularly true in the cases of single-element piezoelectric drivers.

It is readily apparent, based on the disclosure of the driving elements and the geometric arrangement thereof illustrated in the various figures of this case, that a wide range of driving element assemblies, geometries, frequencies and voltage magnitudes of the driving eletrical signals, and the like, are possible to form an operable electromechanical translation device. Any such geometrical arrangements, use of "V" shaped slots, and the like, and driving elements in cooperation with the piezoelectric driving elements and engaging elements described herein are all intended to be within the scope and teachings of the present invention.

What is claimed is:

1. An electromechanical translation apparatus adapted for use with a substantially incompressible member having a relatively smooth exterior outer surface to produce incremental relative movement therebetween comprising a housing adapted to be positioned adjacent a said member;

a first engaging element located within said housing, said first engaging element having a first end and a second end which is located in a spaced opposed relationship to said first end and wherein said first end has an outer surface formed into a predetermined shape which is adapted to selectively clamp a said member at a selected location on its said outer surface in response to a clamping force of a first magnitude and to be incrementally translated with a said member and which is responsive to a clamping force of a second magnitude to be slidable relative to a said member's outer surface, said first engaging element being formed of a material which is capable of transmitting a driving force applied to said second end through said first engaging element and to said first end as a clamping force which is applied onto said selected location on a said member's outer surface;

a first piezoelectric driving element which is operatively coupled to said second end of said first engaging element and operatively coupled to aid housing, said first piezeoelectric driving element being capable of being selectively expanded and contracted in response to a voltage of a selected magnitude and a selected frequency being applied thereto to produce between said housing and said first engaging element a driving force which in magnitude between a first magnitude and a second magnitude and which is adapted to be conducted through said first engaging member to said first end to be applied as a variable clamping force on a selected location of a said member's outer surface and wherein the clamping force thereon varies between a first magnitude and a second magnitude;

a second engaging element located within said housing at a different location relative to that of said first engaging element, said second engaging element having a first end which is located in a spaced opposed relationship to said first end and wherein said first end has an outer surface formed into a predetermined shape which is adapted to selectively clamp a said member at a different selected location on its said outer surface in response to a clamping force of a second magnitude to be slidable relative to a said member's outer surface, said second engaging element being formed of a material which is capable of transmitting a driving force applied to said second end through said second engaging element and to said first end as a clamping force which is applied onto said different location on a said member's outer surface;

a second piezoelectric driving element which is operatively coupled to said second end of said second engaging elemcnt and operatively coupled to said housing, said second piezeoelectric driving element being capable of being selectively expanded and contracted in response to a voltage of a selected magnitude and a selected frequency being applied thereto to produce between said housing and said second engaging member a driving force which varies in magnitude between a first magnitude and a second magnitude and which is adapted to be conducted through said second engaging member to said first end to be applied as a variable clamping force on a different selected location of said member's outer surface wherein the clamping force thereon varies between a first magnitude and a second magnitude; and compliance means operatively coupled to the housing for urging the first and second engaging elements and the first and second piezoelectric driving elements toward a said member and for holding said engaging elements in contact with a said member;

said first engaging element and said second engaging element being responsive to the selective expansion and contraction of said first piezoelectric driving element and said second pizeoelectric driving element to clamp and translate said housing in a selected direction relative to a said member.

2. An electromechanical translation apparatus comprising a housing having a first section joined to a second section through a compliance means which is adapted to urge said sections towards each other, said housing being adapted to receive a separate member between said sections;

a pair of engaging elements positioned one in each section of the housing, each of said pair of engaing elements having a first end and a second end located in a spaced opposed relationship to said first end and wherein said first end has a contacting surface formed into a predetermined shape which is adapted to engage and clamp a said separate member at selected locations on the outer surface thereof with a bias clamping force having a magnitude determined by said compliance means, said engaging elements being further responsive to a variable clamping force of a first magnitude which is additive to said bias clamping force to clamp said first end thereof intimately against the outer surface of a said separate member so as to be incrementally translatable therewith and to said variable clamping force of a second magnitude which is subtractive to said bias clamping force so as to enable said first end to be slidably movable relative to the outer surface of a said separate member, said pair of engaging elements being formed of a material which is capable of transmitting a driving force applied to said second end through said engaging elements and to said first end as a clamping force onto said selected locations of the outer surface of a said separate member;

a pair of piezoelectric driving elements one each being operatively coupled to said second ends of said pair of engaging elements and operatively coupled one each to said sections of said housing, said pair of piezoelectric driving elements each being capable of being selectively expanded and contracted in response to a voltage of a selected magnitude and a selected frequency being applied thereto to produce between said housing sections and said pair of engaging members a variable driving force which varies in magnitude between a first magnitude and a second magnitude and which is adapted to be conducted through each of said engaging members to said first end to be applied to the outer surface of a said separate member as a variable clamping force which varies between a first magnitude and a second magnitude;

said pair of engaging elements being responsive to the selective expansion and contraction of said pair of piezoelectric elements to clamp and translate said housing in a selected direction relative to a said separate member.

3. An electromechanical translation apparatus adapted to produce incremental movement relative to a separate member comprising a housing;

first and second engaging elements each of which is positioned at a selected location within and supported by said housing, each of said first and second engaging elements having a first end and a second end wherein said second end is located in a spaced opposed relationship to said first end and wherein each of first ends is adapted to removably clamp a said member at different locations, said first and second engaging elements being responsive to a driving force selectively applied to said second ends to transmit said driving force therethrough to said first ends to selectively clamp and be incrementally movable with a said member;

a pair of piezeoelectric driving elements, one of which is operatively coupled to one of said first engaging element's second end and the other of which is operatively coupled to the second engaging element's second end, said pairs of piezoelectric driving elements being capable of being selectively expanded and contracted in response to a voltage of a selected magnitude and selected frequency to produce a variable clamping force having a selected direction between said housing and said first and second elements which is adapted to be transmitted through said first and second engaging elements to selectively clamp said first ends of said first and second elements to a selected location of a said separate member so as to be incrementally movable therewith and to permit the first ends to be slidably movable relative to said separate member in the absence of a selective clamping force; and compliance means operatively coupled to the housing for urging the first and second engaging elements and said pair of piezoelectric driving elements toward a said member and for holding said engaging elements in contact with a said member;

said first and second engaging elements being responsive to the selective expansion and contraction of said pair of piezoelectric elements to cause said housing to move in a selected direction relative to a said member.

4. The electromechanical translation apparatus of claim 3 further comprising a force member including means defining an outer surface having two opposed translation surfaces; and a second and third piezoelectric translating means one of which is operatively coupled between said housing and to a different one of said translation surfaces on said force member, said second and third piezoelectric translating means being selectively expanded and contracted between said housing and its associated translation surface in response to a voltage of a selected magnitude and frequency being applied thereto to produce an incremental translation in at least one of a first and second direction;

said second and third piezoelectric translating means being capable of responding to electrical signals to cause one of said second and third piezoelectric translating means to expand and the other of said second and third piezoelectric translating means to contract to produce a translation force on said force member causing the same to translate in at least one of said first and second directions.

5. An electromechanical translation apparatus adapted to produce incremental movement relative to a separate member comprising a housing;

first and second engaging elements each of which is positioned at a selected location within and supported by said housing, each of said first and second engaging elements having a first end and a second end wherein said second end is located in a spaced opposed relationship to said first end and wherein each of first ends is adapted to removably clamp a said member at different locations, said first and second engaging elements being responsive to a variable driving force selectively applied to said second ends and transmitted therethrough to said first ends to selectively clamp and be incrementally movable with a said member and to selectively enable said first end to be slidable relative to the said member's outer surface;

a pair of piezoelectric driving elements, one of which is rigidly affixed to one of said first engaging element's second end and the other of which is operatively coupled to the second engaging element's second end, said pairs of piezoelectric driving elements being capable of being selectively expanded and contracted in response to a voltage of a selected magnitude and frequency being applied thereto to produce a variable driving force between said housing and said first and second elements which is adapted to be transmitted through said first and second engaging elements to selectively clamp said first ends of said first and second engaging elements to selected locations of a said member and to enable said first ends of the first and second engaging elements to slide relative to a said member's outer surface other than when selectively clamped thereto for incremental movement therewith;

compliance means operatively coupled to the housing for urging said first and second engaging elements, said pair of piezoelectric driving elements and said incremental driving means toward a said member and for holding said engaging elements into contact with a said member;

said first and second engaging elements being responsive to the selective expansion and contraction of said pair of piezoelectric elements to cause said housing to move in a selected direction relative to a said member.

6. The electromechanical driving means of claim 5 wherein said incremental driving means includes a force member including means defining an outer surface having two opposed translation surfaces; and a second and third piezoelectric translating means one of which is operatively coupled between said housing and to a different one of said translation surfaces on said force member, said second and third piezoelectric translating means being selectively expanded and contracted between said housing and its associated translation surface in response to electrical signal voltages of a selected magnitude and frequency being applied thereto to produce an incremental translation in at least one of a first and second direction;

said second and third piezoelectric translating means being capable of responding to electrical signals to cause one of said second and third piezoelectric translating means to expand and the other of said second and third piezoelectric translating means to contract to produce a translation force on said force member causing the same to translate in at least one of said first and second directions.

7. The electromechanical driving means of claim 6 further comprising control means for producing electrical signals of a selected magnitude and frequency and for selectively applying the same to said pairs of said piezoelectric driving means and said second and third pairs of piezoelectric translating means in a programmed sequence to produce relative linear movement between said supporting means and said member.

8. The electromechanical driving means of claim 6 further comprising control means for producing electrical signals of a selected magnitude and selected frequency and for selectively applying the same to said pairs of said piezoelectric driving means and to said second and third pairs of piezoelectric translating means in a programmed sequence to produce relative rotational movement between said supporting means and said member.

9. The electromechanical driving means of claim 6 wherein said force member is in the form of a "D" shaped member and wherein said second and third pairs of piezoelectric translating means are operatively coupled in a spaced coplanar relationship on the elongated portion of the "D" shaped member and operatively coupled to the housing.

10. The electromechanical driving means of claim 9 wherein said second and third pairs of piezoelectric driving means are affixed between the "D" shaped force member and the housing.

11. The electromechanical driving means of claim 6 wherein said force member is in the form of a "U" shaped member and wherein said second and third pairs of piezoelectric translating means are operatively coupled in a spaced coplanar relationship on the upper portion of the "U" shaped member and operatively coupled to the housing.

12. An electromechanical piezoelectric motor for producing rotational motion relative to a shaft comprising a housing having a first section joined to a second section through a spring integral with the housing sections;

a pair of engaging elements having a first end having a substantially planar outer surface which is adapted to selectively clamp a said shaft at a selected location on its said outer surface in response to a clamping force of a first magnitude and to be incrementally translated with a said shaft and which is responsive to a clamping force of a second magnitude to be slidable relative to a said shaft's outer surface;

a pair of piezoelectric driving elements one of which is operatively coupled to one of each pair of said engaging elements and operatively coupled to said housing, said pair of piezoelectric driving elements being capable of being selectively expanded and contracted in response to a voltage of a selected magnitude and a selected frequency being applied thereto to produce between said housing and each of said pair of engaging elements a driving force which varies in magnitude between a first magnitude and a second magnitude and which is adapted to be applied as a variable clamping force on a selected location of a shaft's outer surface and wherein the clamping force thereon varies between a first magnitude and a second magnitude;

said pair of engaging elements being responsive to the selective expansion and contraction of said pair of piezoelectric driving elements to clamp and translate said housing in a selected direction relative to a said member.

13. A piezoelectric electromechanical translation apparatus comprising a housing having a first section joined to a second section through a spring which is adapted to urge said sections towards each other, said housing sections being adapted to receive a separate member therebetween;

a pair of engaging elements positioned one in each section of the housing, each of said pair of engaging elements having a first end and having a contacting surface formed into a predetermined shape which is adapted to engage and clamp a said separate member at selected locations on the outer surface thereof with a bias clamping force having a magnitude determined by said spring, said engaging elements being further responsive to a variable clamping force of a first magnitude which is additive to said bias clamping force to clamp said first end thereof intimately against the outer surface of a said separate member so as to be incrementally translatable therewith and to said variable clamping force of a second magnitude which is subtractive to said bias clamping force so as to enable said first end to be slidably movable relative to the outer surface of a said separate member;

a pair of piezoelectric driving elements one each being operatively coupled to each of said pair of engaging elements and operatively coupled one each to said sections of said housing, said pair of piezoelectric driving elements each being capable of being selectively expanded and contracted in response to a voltage of a selected magnitude, selected frequency and phase being applied thereto to produce between said housing sections and said pair of engaging members a variable driving force which varies in magnitude between a first magnitude and a second magnitude and which is adapted to be conducted through each of said engaging members to said first end to be applied to the outer surface of a said separate member as a variable clamping force which varies between a first magnitude and a second magnitude;

said pair of engaging elements being responsive to the selective expansion and contraction of said pair of piezoelectric elements to clamp and translate said housing in a selected direction relative to a said separate member.

14. A piezoelectric motor having at least two housing sections joined together by a compliance means wherein the housing is adapted to impart relative motion between the housing and a separate member characterized in that at least two piezoelectric driving assemblies which are operatively coupled between the housing sections and a separate member and each piezoelectric assembly includes an engaging member adapted to engage a said separate member;

a piezoelectric driving element operatively coupled to said engaging member and which is adapted to apply a driving force on and causing said engaging element to selectively clamp and release a said separate member in response to a voltage of a selected magnitude and frequency being applied to said piezoelectric driving element.

15. The piezoelectric motor of claim 14 further characterized in that each piezoelectric assembly further includes a force member operatively coupled to said piezoelectric driving element to shift the piezoelectric driving element and the engaging element along a predetermined path; and at least one piezoelectric translating element operatively coupled between the housing and said force member to drive the force member along the predetermined path.

16. A method for producing relative motion between a housing and a separate member comprising the steps of placing a housing having a first section joined to a second section through a spring integral with the housing sections and a pair of engaging elements positioned in each of said first section and said second section around the separate member;

urging said pair of engaging elements with a clamping bias developed from the spring toward said separate member wherein each of said pair of engaging elements has a first end including means defining a preformed outer surface which is adapted to selectively clamp the outer surface of said separate member at a selected location thereon in response to a clamping force of a first magnitude and to be incrementally translated with said separate member and which is responsive to a clamping force of a second magnitude to be slideable relative to a said shaft's outer surface; and producing, with a pair of piezoelectric driving elements one of which is operatively coupled to one of each pair of said engaging elements and operatively coupled to said housing and wherein said pair of piezoelectric driving elements is selectively expanded and contracted in response to electric signals of a selected magnitude and a selected frequency being applied thereto, a driving force between said housing and said pair of engaging elements, said driving force being capable of varying in magnitude between a first magnitude and a second magnitude and which is adapted to be applied as a variable clamping force on a selected location of a said separate member's outer surface wherein the clamping force thereon varies between a first magnitude and a second magnitude.

17. The method of claim 16 further comprising the steps of producing with an incremental driving means operatively coupled to said pair of piezoelectric driving elements a translating force which selectively translates said pair of piezoelectric driving means and said pair of engaging elements in one of a first and second direction;

said pair of engaging elements being responsive to the selective expansion and contraction of said pair of piezoelectric driving means to cause said housing to move in a selected direction relative to a said member.

18. The method of claim 17 further comprising the steps of producing with a control means electrical signals of a selected magnitude and frequency and for selectively applying the same to said pair of said piezoelectric driving elements and said incremental driving means in a programmed sequence to produce relative linear movement between said supporting means and said member.

19. The method of claim 17 further comprising the steps of producing with a control means electrical signals of a selected magnitude and frequency and for selectively applying the same to said pair of said piezoelectric driving elements and said incremental driving means in a programmed sequence to produce relative rotational movement between said supporting means and said member.

20. The method of claim 16 further comprising the steps of producing with a force member having second and third piezoelectric translating elements operatively coupled to two opposed translation surfaces a translating force which selectively translates said pair of piezoelectric driving means and said pair of engaging elements in one of a first and second direction.

21. A method for producing relative motion between a housing and a separate member comprising the steps of urging a housing having at least two engaging elements with a clamping bias developed from a compliance means integral with the housing wherein each of the engaging elements has an engagement end and each of which is adapted to selectively clamp the outer surface of said separate member at a selected location thereon in response to a clamping force of a first magnitude and to be incrementally translated therewith and which is responsive to a clamping force of a second magnitude to be slideable relative to a said separate member's outer surface the two engaging elements into engagement with a said separate member's outer surface; and producing, with at least two piezoelectric driving elements one of which is operatively coupled to one of said engaging elements and operatively coupled to said housing and wherein said pair of piezoelectric driving elements is selectively expanded and contracted in response to a voltage of a selected magnitude and a selected frequency being applied thereto, a driving force between said housing and said engaging elements, said driving force being capable of varying in magnitude between a first magnitude and a second magnitude and which is adapted to be applied as a variable clamping force on a selected location of a said separate member's outer surface wherein the clamping force thereon varies between a first magnitude and a second magnitude.

22. The method of claim 21 further comprising the step of shifting the piezoelectric driving elements and the engaging elements along a predetermined path with an incremental driving means having at least one piezoelectric translating element which is responsive to a voltage of a selected magnitude and selected frequency being applied thereto to expand and contract the piezoelectric translating element.

23. The method of claim 22 further comprising the step of controlling the magnitude, frequency and programmed sequence of the voltages applied to said piezoelectric driving elements and said piezoelectric translating element to cause relative rotational movement between the housing and a said separate member.

24. The method of claim 22 further comprising the step of controlling the magnitude, frequency and programmed sequence of the voltages applied to said piezoelectric driving elements and said piezoelectric translating element to cause relative linear movement between the housing and a said separate member.

25. An electromechanical translation apparatus adapted to produce incremental movement relative to a separate member comprising
   a housing;
   first and second engaging elements each of which is positioned at a selected location within and supported by said housing, each of said first and second engaging elements having a first end and a second end wherein said second end is located in a spaced opposed relationship to said first end and wherein each of the first ends is adapted to removably clamp a said separate member at a selected location, said first and second engaging elements being responsive to a driving force selectively applied to said second ends to transmit said driving force therethrough to said first ends to selectively clamp and be incrementally movable with a said member;
   a pair of piezoelectric driving elements, one of which is operatively coupled to one of said first engaging element's second end and the other of which is operatively coupled to the second engaging element's second end, said pairs of piezoelectric driving elements being capable of being selectively expanded and contracted in response to a voltage of a selected magnitude and selected frequency to produce a variable clamping force having a selected direction between said housing and said first and second elements which is adapted to be transmitted through said first and second engaging elements to selectively clamp said first ends of said first and second elements to selected locations on a said separate member so as to be incrementally movable therewith and to permit the first ends to be slidably movable relative to said separate member in the absence of a selective clamping force;
   a pair of force members, one of which is operatively coupled to one of the pair of piezoelectric driving elements, each of said pair of force members including means defining an outer surface having two opposed translation surfaces;
   a second and third pair of pizeoelectric translating means wherein one of each pair is oepratively coupled to a different one of the opposed translation surfaces on its associated force member, said second and third pairs of piezoelectric translating means being selectively expanded and contracted in response to a voltage of a selected magnitude and frequency being applied thereto to produce an incremental translation in at least one of a first and second direction; and
   compliance means operatively coupled to the housing for urging said first and second engaging elements, said pair of piezoelectric driving elements, said pair of force members and said second and third pairs of piezoelectric translating means toward a said member and for holding said engaging elements into contact with a said member;
   said first and second engaging elements being responsive to the selective expansion and contraction of said pair of piezoelectric elements to clamp said separate member and said second and third pairs of piezoelectric translating means being capable of responding to electrical signals to cause one of said second and third pairs of pizeoelectric translating means to expand and the other of said second and third pairs of pizeoelectric translating means to contract to produce a translation force on said force member causing the same to translate the one of the pairs of pizeoelectric driving elements operatively coupled thereto in at least one of said first and second directions.

26. An electromechanical translation apparatus adapted to produce incremental movement relative to a separate member comprising
   a housing;
   first and second engaging elements each of which is position at a selected location with and supported by said housing, each of said first and second engaging elements having a first end and a second end wherein said second end is located in a spaced opposed relationship to said first end and wherein each of the first ends is adapted to removable clamp a said member at a selected location, said first and second engaging elements being responsive to a variable driving force selectively applied to said second ends and transmitted therethrough to said first ends to selectively clamp and be incrementally movable with a said member and to selectively enable said first end to be slidable relative to the said member's outer surface;
   a pair of piezoelectric driving elements, one of which is rigidly affixed to one of said first engaging element's second end and the other of which is rigidly affixed to the second engaging element's second end, said pair of piezoelectric driving elements being capable of being selectively expanded and contracted in response to a voltage of a selected magnitude and frequency being applied thereto to produce a variable driving force between said housing and said first and second engaging elements which is adapted to be transmitted through said first and second engaging elements to selectively clamp said first ends of said first and second elements to selectively clamp said first ends of said first and second elements to selected locations on a said member and to enable said first ends of the first and second engaging elements to slide relative to a said member's outer surface other than when selectively clamped thereto for incremental movement therewith;
   incremental force member driving means operatively coupled to said pair of piezoelectric driving elements to selectively translate said pair of piezoelectric driving means and said first and second engaging elements in one of a first and second direction, said incremental force member driving means including a pair of force members, one of which is operatively coupled to one of the pairs of piezoelectric driving elements, each of said force members including means defining an outer surface having two opposed translation surfaces;
   second and third pairs of piezoelectric translating means one of which is operatively coupled to a different one of said translation surfaces on said coupling member, said second and third pairs of piezoelectric translating means being selectively expanded and contracted in response to electric signals voltage of a selected magnitude and frequency being applied thereto to produce an incremental translation in at least one of a first and second direction; and
   compliance means operatively coupled to the housing for urging said first and second engaging elements, said pair of piezeoelectric driving elements, said incremental force member driving means and said second and third pairs of piezeoelectric translating means toward a said member and for holding said engaging elements into contact with a said member;

said first and second engaging elements being responsive to the selective expansion and contraction of said pair of piezoelectric elements to clamp a said separate member and said second and third pairs of piezoelectric translating means being capable of responding to electrical signals to cause one of said second and third pairs of piezeoelectric translating means to expand and the other of said second and third pairs of piezeoelectric translating means to contract to produce a translation force on said force member causing the same to translate the one of the pairs of piezoelectric driving elements operatively coupled thereto in at least one of said first and second directions.

27. The electromechanical driving means of claim 6 further comprising control means for producing electrical signals of a selected magnitude and frequency and for selectively applying the same to said pairs of said piezoelectric driving means and said second and third pairs of piezoelectric translating means in a programmed sequence to produce relative-linear movement between said supporting means and said member.

28. The electromechanical driving means of claim 6 further comprising .

control means for producing electrical signals of a selected magnitude and selected frequency and for selectively applying the same to said pairs of said piezoelectric driving means and to said second and third pairs of piezoelectric translating means in a programmed sequence to produce relative rotational movement between said supporting means and said member.

29. The electromechanical driving means of claim 6 wherein said force member is in the form of a "D" shaped member and wherein said second and third pairs of piezoelectric translating means are operatively coupled in a spaced coplanar relationship on the elongated portion of the "D" shaped member and operatively coupled to the housing.

30. The electromechanical driving means of claim 29 wherein said second and third pairs of piezoelectric driving means are affixed between the "D" shaped force member and the housing.

31. The electromechanical driving means of claim 6 wherein said force member is in the form of a "U" shaped member and wherein said second and third pairs of piezoelectric translating means are operatively coupled in a spaced coplanar relationship on the upper portion of the "U" shaped member and operatively coupled to the housing.

32. A method for moving a first member relative to a second member comprising the steps of vibrating at least one pizeoelectric driving element having an engagement element affixed thereto and in engagement with the first member so as to have a component of motion applied thereto in at least one of a linear path and an arcuate-shaped path for imparting motion in a predetermined direction to the first member;

applying an electric signal of a selected frequency and magnitude to the piezoelectric driving element causing a change in the geometrical dimension thereof to develop a clamping force between the engagement element and the first member wherein the clamping force increases as the piezoelectric engagement element moves toward one of its limits of motion and to decrease the clamping force as the piezoelectric driving element moves toward the other limit of its motion; and maintaining with a compliance means the engagement element in contact with the first member while coupling the dynamic clamping and translation forces developed by said at least one piezoelectric driving element between the first member and the second member through said engagement element as the magnitude of the clamping force increases and decreases in response to the electrical signal.

33. The method of claim 32 further comprising the step of positioning a translation element between the pizeoelectric driving element and the engagement element wherein the change in the geometrical dimension of the piezoelectric driving element varies the magnitude of the clamping force so as to move the translation element and the engagement element towards and away from the driven member in response to the motion of the driving element as it moves toward and away from its limits of motion.

34. A driving apparatus adapted for use with a driven member comprising a housing;

at least one piezoelectric driving element which is adapted to be positioned between said housing and a driven member;

an engagement element which is adapted to be positioned between the piezeoelectric driving element and a driven member;

compliance means operatively coupled to the housing for urging the piezoelectric driving element and the engagement element toward said driven member and for holding said engagement element in contact with the driven member; and means for applying an electrical signal having a predetermined frequency and magnitude to the piezoelectric element to develop a clamping force which increases as the piezeoelectric element moves towards one of its limits of motion in response to the electrical signal and which decreases as the pizeoelectric element moves toward the other limit of motion in response to the electrical signal reacting the inertia of the housing against the inertia of the driving element and engagement element which is capable of causing relative motion between the housing and a driven member.

35. An electromechanical translation apparatus adapted for use with a substantially incompressible member having a relatively smooth exterior surface to produce incremental movement therebetween comprising a housing;

a first engagement element located within said housing and having a selected surface formed into a predetermined shape which is adapted to selectively clamp a said member at a selected location on its outer surface in response to a clamping force of a first magnitude and to be incrementally translated with said member and which is responsive to a clamping force of a second magnitude to be slidable relative to said member's other surface, said first engagement element being formed of a material which is capable of transmitting a driving force applied thereto as a clamping force which is applied to the selected location on the drive member's outer surface;

a piezoelectric driving element which is operatively coupled to said first engagement element and to said housing, said first piezoelectric element being capable of being selectively expanded and contracted in response to an electrical signal of a selected magnitude and frequency to produce between the housing and the first engagement element a driving force which varies in magnitude between a first magnitude and a second magnitude and which is adapted to be conducted through said first engagement member which is in mechanical resonance with the piezoelectric driving elements to said driven member to be applied thereon as a variable clamping force to produce a net output force along at least one of a linear path and an arcuate path and in a selected direction which is the direction of the greater force so as to produce a net motion in the direction having the greater magnitude of net force; and compliance means operatively coupled to the housing for urging said first engaging element and said piezeoelectric driving element toward a said member and for holding said engaging elements in contact with a said member.

36. The driving apparatus of claim 35 further comprising a second piezoelectric driving element which is positioned in a predetermined relationship relative to said first piezoelectric driving element and located between said driven element and said housing;

a second engagement element positioned between said second piezoelectric driving element and said driven member and which is responsive to an electrical signal of a predetermined amplitude and frequency applied to said second piezoelectric driving element to produce additional clamping and translation forces which are additive in a selected direction to those generated by the first piezoelectric driving element and first engagement element to increase the magnitude of the net force in the direction of motion.

* * * * *